US007002920B1

(12) United States Patent
Ayyagari et al.

(10) Patent No.: US 7,002,920 B1
(45) Date of Patent: Feb. 21, 2006

(54) CAPACITY ENHANCEMENT FOR MULTI-CODE CDMA WITH INTEGRATED SERVICES THROUGH QUALITY OF SERVICE AND ADMISSION CONTROL

(75) Inventors: Deepak Ayyagari, Arlington, MA (US); Samuel Resheff, Newton, MA (US); Anthony Ephremides, Bethesda, MD (US)

(73) Assignee: Verizon Laboratories Inc., Waltham, MA (US)

( * ) Notice: Subject to any disclaimer, the term of this patent is extended or adjusted under 35 U.S.C. 154(b) by 1067 days.

(21) Appl. No.: 09/887,398

(22) Filed: Jun. 22, 2001

Related U.S. Application Data

(63) Continuation of application No. 09/113,551, filed on Jul. 10, 1998.

(51) Int. Cl.
*G01R 31/08* (2006.01)
(52) U.S. Cl. ........................ 370/252; 370/335; 370/465
(58) Field of Classification Search ................ 370/335, 370/342, 336, 468, 465, 441, 230, 235, 310, 370/252, 431, 437, 445; 455/456.2, 452.1, 455/434, 522
See application file for complete search history.

(56) References Cited

U.S. PATENT DOCUMENTS

| 5,107,487 | A | | 4/1992 | Vilmur et al. ................. 370/18 |
|---|---|---|---|---|
| 5,257,283 | A | | 10/1993 | Gilhousen et al. .............. 375/1 |
| 5,299,226 | A | | 3/1994 | Schilling ........................ 375/1 |
| 5,341,397 | A | | 8/1994 | Gudmunson ................ 370/335 |
| 5,457,813 | A | | 10/1995 | Poutanen ...................... 455/70 |
| 5,481,561 | A | | 1/1996 | Fang ........................... 375/205 |
| 5,485,486 | A | | 1/1996 | Gilhousen et al. .......... 375/205 |
| 5,548,616 | A | | 8/1996 | Mucke et al. ............... 375/295 |
| 5,566,165 | A | | 10/1996 | Sawahashi et al. ........... 370/18 |
| 5,570,353 | A | | 10/1996 | Keskitalo et al. ............. 370/18 |
| 5,590,409 | A | | 12/1996 | Sawahashi et al. ........... 455/69 |
| 5,621,723 | A | | 4/1997 | Walton ........................ 370/335 |
| 5,623,484 | A | | 4/1997 | Muszynski .................. 370/335 |
| 5,623,486 | A | | 4/1997 | Dohi et al. .................. 370/342 |
| 5,722,051 | A | | 2/1998 | Agrawal ....................... 455/69 |
| 5,734,646 | A | | 3/1998 | I ................................. 370/335 |
| 6,038,452 | A | | 3/2000 | Strawczynski .............. 455/446 |
| 6,044,072 | A | | 3/2000 | Ueda .......................... 370/335 |
| 6,069,883 | A | * | 5/2000 | Ejzak et al. ................. 370/335 |
| 6,070,085 | A | | 5/2000 | Bender ........................ 455/522 |

(Continued)

OTHER PUBLICATIONS

Bambos, N. et al., Radio Link Admission Control Algorithms for Wireless Networks with Power Control and Active Link Quality Protection, Tech. Report UCLA-ENG-94-25, UCLA School of Engg., p. 1-22, 1994.

(Continued)

*Primary Examiner*—Chau Nguyen
*Assistant Examiner*—Ricardo Pizarro

(57) ABSTRACT

With the addition of high-speed data traffic to traditional CDMA cellular networks, there is a need to efficiently utilize system capacity so that the quality of service of existing voice and low-speed data users is maintained while new high-speed data users are added to the network. Methods and systems are presented that control allocation of power to users, quality of service requirements, and/or user activity levels to enhance capacity utilization. These methods and systems are based on a method for estimating the capacity of a CDMA carrier with both voice and data users using an interference-based analysis of the reverse link. In particular, the methods enhance capacity utilization in a multi-code CDMA network architecture, in which several codes are allocated to a single high-speed data user for parallel transmission.

2 Claims, 10 Drawing Sheets

U.S. PATENT DOCUMENTS

| | | | | |
|---|---|---|---|---|
| 6,088,335 A | * | 7/2000 | I et al. | 370/252 |
| 6,128,498 A | * | 10/2000 | Benveniste | 455/450 |
| 6,760,567 B1 | * | 7/2004 | Jeong et al. | 370/252 |

OTHER PUBLICATIONS

N. Bambos et al., Power Control Based Admission Policies in Cellular Radio Networks, Proc. of IEEE Globecom, pp. 863-867, 1992.

Evans, J. et al., Effective Interference: a Novel approach for Interference Modelling and Traffic Analysis in CDMA Cellular Networks, Proc. of IEEE Globecom, vol. 3, pp. 433-442, 1995.

Evans, J. et al., Call Admission Control in Multiple Service DS-CDMA Cellular Networks, Proc. Of IEEE Vehicular Tech. Conf., vol. 1, pp. 227-231, 1996.

Zander, J., Distributed Cochannel Interference Control in Cellular Radio Systems, IEEE Transactions on Vehicular Technology, vol. 41, pp. 305-311, Aug. 1992.

Grandhi, S.A. et al., Distributed Power Control in Cellular Radio Systems, IEEE Transactions on Communications, vol. 42, pp. 226-228, Feb./Mar./Apr. 1994.

Grandhi, S.A. et al., Centralized Power Control in Cellular Radio systems, IEEE Transactions on Vehicular Technology, vol. 42, pp. 466-468, Nov. 1993.

Grandhi, S.A. et al., Constrained Power Control in Cellular Radio Systems, Proc. of IEEE Vehicular Tech. Conference, 1994.

Foschini, G.J. et al., A Simple Distributed Autonomous Power Control Algorithm and its Convergence, IEEE Transactions on Vehicular Technology, vol. 42, pp. 641-646, Nov. 1993.

Yates, R.D., A Framework for Uplink Power Control in Cellular Radio systems, IEEE Journal on Selected Areas in Communication, vol. 13, pp. 1341-1346, Sep. 1995.

Huang, C.Y. et al., Call Admission in Power Controlled CDMA Systems, Proc. of IEEE Vehicular Technology Conference, vol. 3, pp. 1665-1669, 1996.

Yates, R.D. et al., Integrated Power Control and Base Station Assignment, IEEE Trans. on Vehicular Technology, vol. 44, pp. 638-644, Aug. 1995.

Hanly, S.V., An Algorithm for Combined Cell-site Selection and Power Control to Maximize Cellular Spread Spectrum Capacity, IEEE Journal on Selected Areas in Communication, vol. 13, pp. 1332-1340, Sep. 1995.

Mitra, D., An Asynchronous Distributed Algorithm for Power control in Cellular Radio systems, $4^{th}$ WINLAB workshop in $3^{rd}$ Generation Wireless Info. Networks, 1993.

Fletcher, R. Practical Methods of Optimization, John Wiley and Sons, 1987.

TR 45.5 Working Committee for CDMA, Service Description for Third Generation CDMA Systems applicable to IMT-2000 (Version 0.07) Aug. 5, 1997.

Chin-Lin. I. et al., Multi-code CDMA Wireless Personal Communications Networks, in ICC '95 Conference Record, pp. 1060-1064, Jun. 1995.

Chih-Lin, I. et al., Performance of Multi-Code CDMA Wireless Personal Communications Network, Proc. of IEEE Vehicular Technology Conference, pp. 907-911, 1995.

Chih-Lin, I. et al., Variable Spreading Gain CDMA with Adaptive Power Control for Integrated Traffic in Wireless Networks, Proc. of IEEE Vehicular Technology Conference, pp. 794-798, 1995.

Gilhousen et al., On the Capacity of a Cellular CDMA System, IEEE Transactions on Vehicular Technology, vol. 40, pp. 301-312, May 1991.

Liu, Z. et al., Interference Issues in Multi-Code CDMA Networks, PIMRC 1996, pp. 98-102, Oct. 1996.

Viterbi, A.J. et al., Erlang Capacity of a Power controlled CDMA System, IEEE Journal on Selected Areas in Communications, vol. 11, pp. 892-899, Aug. 1993.

Cameron, R. et al., Performance Analysis of CDMA with Imperfect Power Control, IEEE Transactions on Communication Theory, vol. 44, pp. 777-781, Jul. 1996.

Priscoli, F.D. et al., Effects of Imperfect Power Control and User Mobility on a CDMA Cellular Network, IEEE Journal of Selected Areas in Communication, vol. 14, pp. 1809-1817, Dec. 1996.

Mandayam, N.B. et al. Erlang Capacity for an Integrated Voice/Data DS-CDMA Wireless System with Variable Bit Rate Sources, Proc. of PIMRC, vol. 3, pp. 1078-1082, 1995.

Hanly, S.V., An Algorithm for Combined Cell-site Selection and Power control to Maximize Cellular Spread Spectrum Capacity, IEEE Journal on Selected Areas in Communication, vol. 13, pp. 1332-1340, Sep. 1995.

Holtzman, J.M., A Simple, Accurate Method to Calculate Spread Spectrum Error Probabilities, IEEE Transactions on Communications, vol. 40, pp. 461-464, Mar. 1992.

Padovani, R., Reverse Link Performance of IS-95 Based Cellular Systems, IEEE Personal communications, No. 3, pp. 28-34, 1994.

* cited by examiner

CAPACITY ENHANCEMENT FOR MULTI-CODE CDMA WITH INTEGRATED SERVICES THROUGH QUALITY OF SERVICE AND ADMISSION CONTROL

This application is a CON of Ser. No. 09/113,551 filed Jul. 17, 1998

BACKGROUND OF THE INVENTION

The present invention relates to cellular networks and, more particularly, to methods of improving capacity utilization of a cellular carrier with integrated voice and data traffic through methods involving cellular network admission control, power control, and quality of service control.

Until recently, cellular telephone networks provided service for voice users only and did not address high-speed data applications such as electronic mail, facsimile, image transmission, and FTP transfer. Currently, network engineers are designing cellular networks, in particular Code Division Multiple Access (CDMA) networks, to carry integrated voice and data traffic. For example, the Telecommunications Industry Association (TIA) TR-45.5 cellular CDMA standard committee is developing CDMA networks that can support high-speed data (HSD) along with conventional voice telephony, described in "TR-45.5 Working Committee for CDMA=Phase 1 High Speed Data (HSD) Stage 1 Services Description for HSD Services," October, 1996, which is hereby incorporated by reference. The systems proposed by TR-45.5, for both the 1.25 MHz CDMA channel and the broadband 5 MHz channel, achieve high data rates by implementing a multi-code architecture, which allocates several codes to a single HSD user for parallel transmission, in contrast with a variable gain CDMA system where HSD users use a single code to transmit at different data rates. This allows the user using m codes to transmit at a multiple rate of m times the nominal rate of a single code, e.g., 9.6 kbps. Such a multi-code architecture was proposed in I. Chih-Lin and R. Gitlin, "Multi-Code CDMA Wireless Personal Communications Networks," *ICC '95 Conference Record*, pp. 1060–1064, June, 1995, and further described in I. Chih-Lin, G. Pollini, L. Ozarow, and R. Gitlin, "Performance of multi-code CDMA wireless personal communications network," *Proceedings of IEEE Vehicular Technology Conference*, pp. 907–911, 1995, which are hereby incorporated by reference.

A major issue in the design of a CDMA system with both voice and data users is the efficient use of system capacity. Capacity can generally be defined as the number of voice users and data users at different transmission rates (also referred to herein as different data classes) that can be supported by a CDMA channel with specified Quality of Service (QoS) attributes, specifically frame error rate (FER) and service availability probability (SAP), where the SAP is the probability that the FER does not exceed a predefined threshold. The QoS for a CDMA user is directly related to the ratio of the received bit energy to interference power. In conventional CDMA systems that carry only voice traffic, the FER and SAP targets are identical for all users, and therefore system capacity is maximized when all voice frames are received at the same power level. In a multi-class system, however, different users have different FER and SAP targets, and the relationship between capacity and QoS is more difficult to analyze for two reasons. First, the actual QoS experienced by a voice or HSD user depends on the activity of interfering users and the tightness of the algorithm controlling received power. Second, QoS targets are often "soft" for certain classes of data users (e.g., Internet access), and these users can accept a lower QoS in exchange for enhanced capacity.

Once the intricate relationship between capacity and parameters, such as QoS of users, the mix of voice and data users, their activity level, and their power levels, is established, control methods can be developed that control power allocation, QoS levels, and/or the activity levels of existing users to give additional users access to the system, thereby enhancing capacity utilization.

One previous effort to model CDMA network capacity is K. S. Gilhousen, I. M. Jacobs, R. Padovani, L. A. Weaver and C. A. Wheatley, "On the capacity of a cellular CDMA system," *IEEE Transactions on Vehicular Technology*, vol. 40, pp. 301–312, May, 1991. This interference-based model addresses voice-only systems and assumes perfect power control and a uniform distribution of users in the cell. It has been shown that the interference resulting from HSD mobile users located close to cell boundaries and transmitting at a multiple of the basic rate is much higher than the interference generated by a uniform distribution of an equivalent number of mobiles transmitting at the basic rate (Z. Liu, M. J. Karol, M. E. Zarki, and K. Eng, "Interference issues in multi-code CDMA networks," *PIMRC* 1996, pp. 98–102, October, 1996).

It has also been shown that capacity limitations result from imperfect power control (e.g., A. J. Viterbi and A. M. Viterbi, "Erlang capacity of a power controlled CDMA system," *IEEE Journal on Selected Areas in Communications*, vol. 11, pp. 892–899, August, 1993; R. Cameron and B. Woerner, "Performance analysis of CDMA with imperfect power control," *IEEE Transactions on Communication Theory*, vol. 44, pp. 777–781, July, 1996; F. D. Priscoli and F. Sestini, "Effects of imperfect power control and user mobility on a CDMA cellular network," *IEEE Journal of Selected Areas in Communication*, vol. 14, pp. 1809–1817, December, 1996). One model with imperfect power control was studied in N. B. Mandayam, J. Holtzman, and S. Barberis, "Erlang capacity for an integrated voice/data DS-CDMA wireless system with variable bit rate source," *Proceedings of PIMRC*, vol. 3, pp. 1078–1082, 1995. This model, however, addresses only single code data users, and does not analyze a multi-code CDMA architecture.

The capacity of a CDMA system is also limited by the coverage area of handsets, which depends on the limitations on handset power. In a CDMA system based on the IS-95A standard, voice handsets have a peak output power of 200 mW. An HSD handset with identical power output transmitting at four times the basic rate outputs a maximum of 50 mW per code/channel. A proper analysis of CDMA system capacity should also consider the possible received power limitations for voice and data users.

It is desirable, therefore, to provide a method for determining the capacity of a CDMA system with a mix of voice and multi-code high-speed data users with varying QoS requirements. It is more desirable to provide such a method that considers capacity limitations resulting from imperfect power control. It is also desirable to provide such a method that also considers handset power limitations. Having established such capacity estimation methods, it is ultimately desirable to provide methods for admission control to a CDMA network based on the determined relationship between system capacity and QoS, power allocation, and user activity level, thereby enhancing capacity utilization.

SUMMARY OF THE INVENTION

Methods and systems consistent with the present invention address these needs by controlling admission of new users to the CDMA system through control of power allocation, QoS requirements, and/or the activity level of existing users. Such methods and systems are predicated on methods and systems consistent with the present invention that estimate the capacity of a single CDMA carrier with a mixture of voice and HSD users through an interference-based analysis of the reverse link (mobile to base station).

A method consistent with the present invention for determining the capacity of a CDMA cellular carrier supporting voice and multi-code data users, wherein each user belongs to a user class, and there may be multiple data user classes, comprises the steps of determining a received power level for each user class, and determining a number of users in each user class that satisfies a quality of service requirement based on the received power levels and the activity variables for all user classes.

A method consistent with the present invention for enhancing the capacity of a CDMA cellular carrier supporting voice and multi-code data users comprises the steps of setting a quality of service requirement for the data users based on the traffic load and the quality of service requirement for the voice users, adjusting the received power level of the voice users to be equal, adjusting the received power level of the data users to be equal to that of the voice users, decreasing the received power level of the data users until their quality of service requirement is satisfied, and adjusting the quality of service requirement for the data users in response to a request from a new data user to access the cellular carrier.

Another method consistent with the present invention for enhancing the capacity of a CDMA cellular carrier supporting voice and multi-code data users comprises the steps of determining a measure of traffic from voice users, determining a measure of traffic from data users, assigning each data user the same number of codes, adjusting the activity factor for each data user based on the traffic measures and the quality of service requirement, and controlling the activity level of the data users using the adjusted activity factor.

Yet another method consistent with the present invention for enhancing the capacity of a CDMA cellular carrier supporting voice and multi-code data users comprises the steps of assigning a feasible power level to the users, determining and assigning a minimum power level to the users, determining the maximum received power level, determining the ratio of the maximum received power level to the minimum power level of each user, selecting the smallest ratio, scaling the minimum power level of each user by the smallest ratio, and assigning the scaled power levels to the users.

Systems are also provided for carrying out methodologies consistent with the present invention.

The above desires, and other desires, features, and advantages of the present invention will be readily appreciated by one of ordinary skill in the art from the following detailed description of the preferred implementations when taken in connection with the accompanying drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and their equivalents.

Methods and systems consistent with the present invention provide a methodology for analyzing system capacity for CDMA networks with both voice users and multi-code data users. The methodology uses an interference-based model for the reverse link (mobile to base station) that determines the number of voice users $N_v$ and the number of data users $N_{d,i}$ belonging to each of C data classes i that a CDMA carrier can support. Methods and systems consistent with the present invention also provide admission control schemes that maximize system capacity by controlling power allocation, QoS levels, and/or user activity levels.

Figure 1:
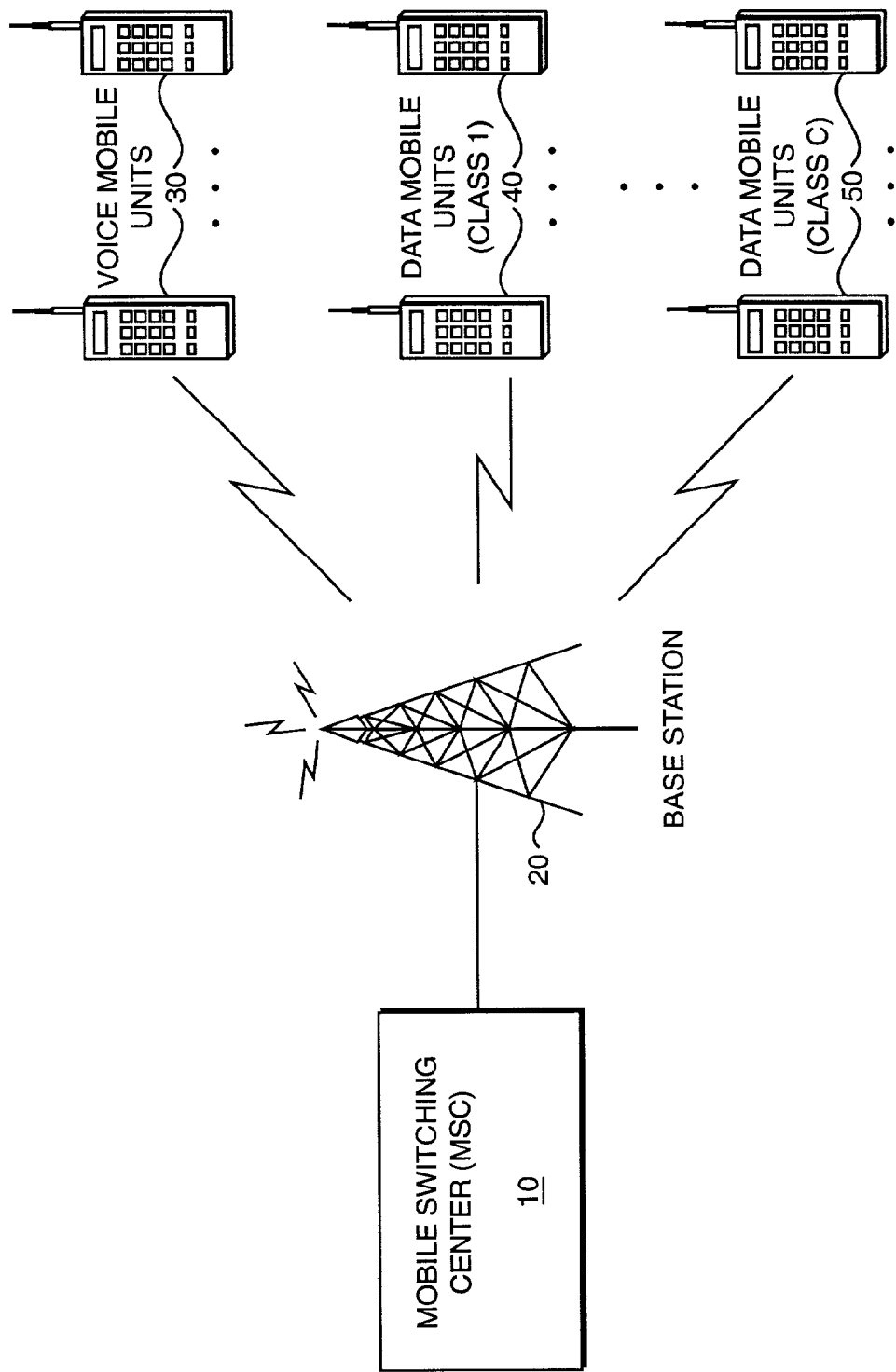
FIG. 1 is a high-level block diagram of a CDMA cellular network consistent with the present invention.

FIG. 1 is a system level block diagram illustrating portions of a CDMA cellular network consistent with the present invention. Mobile Switching Center (MSC) 10 is a cellular telephone network switch that provides processing and switching functions to allow mobile units to communicate with other telephones or devices (cellular and wireline). MSC 10 is connected to one or more base stations (also referred to as cell sites), one of which, base station 20, is shown by way of example. Base station 20 provides radio communication with mobile units. Consistent with the present invention, a CDMA cellular network includes both voice users and multi-code data users, which transmit high-speed data using two or more codes in parallel. By way of example, FIG. 1 shows voice mobile units 30 and data mobile units, each of which belongs to one of C classes of data users. For example, data mobile units 40 belong to class 1, and data mobile units 50 belong to class C. As will be described below, each data user class is defined by a transmission rate and may have QoS requirements independent of those for the voice users or other data user classes.

Figure 2:
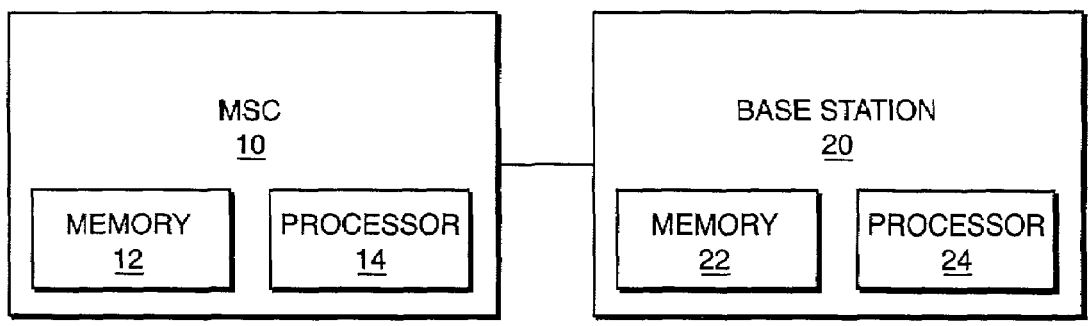
FIG. 2 is a block diagram of the Mobile Switching Center and base station in FIG. 1.

As shown in FIG. 2, MSC 10 includes memory 12 and processor 14, and base station 20 includes memory 22 and processor 24. Methods for admission control and capacity analysis consistent with the present invention are stored as software in memory 12, memory 22, or both and can be executed by processor 14 and/or processor 24. Memory 12 and memory 22 may be implemented with any type of computer-readable medium, such as any electronic, magnetic, or optical read/write storage device. If necessary, signaling for implementation of admission control methods consistent with the present invention may occur via the communication link between MSC 10 and base station 20 or via a signaling link (not shown).

CDMA Carrier Capacity

Methods and systems consistent with the present invention analyze the capacity of a single CDMA carrier with voice users and C classes of data users, where C is an arbitrary number, as shown in FIG. 1. The C classes are defined by the transmission rate requirement. If B is the basic transmission rate of a single code (e.g., 9.6 kbps for IS-95A), data users of class i have a transmission rate of $r_{d,i}*B$. Thus, $r_{d,i}$ represents the number of codes a data user in class i uses for parallel multi-code transmission. The voice users use a single code, i.e., $r_v=1$. The suffix d herein denotes all variables related to data users, and the suffix v denotes the variables corresponding to voice users. Each code used by a data user of class i experiences interference from the voice users, other data users and the user's own $(r_i-1)$ codes (self-interference). Chih-Lin et al. describe a coding method referred to as "sub-code concatenation" whereby all the codes of a single user can be made orthogonal to each other, thus eliminating self-interference. However, in some systems, including IS-95 systems, the codes are non-orthogonal and necessarily contribute to self-interference.

The capacity of the reverse link (i.e., transmission from the mobile unit to the base station) is defined as the vector $\{N_v, N_d\}$, $N_d=[N_{d,1}, N_{d,2}, \ldots, N_{d,C}]$, the number of voice users $N_v$, and the number of data users of class i, $N_{d,i}$, that can be supported on a single CDMA carrier so that their FER and SAP requirements are met. The Service Availability Probability is defined as SAP=Prob(FER≦Threshold). The SAP for voice and the C classes of data users is determined as a function of the capacity $(N_v, N_d)$.

A model for analyzing carrier capacity consistent with the present invention expands on the voice-only model in Gilhousen et al., which is hereby incorporated by reference, to account for integration of voice and multi-code data users. The model makes the following assumptions:

(1) The model assumes a simple correlation receiver. The performance is determined in terms of $E_b/N_0$, the ratio of bit energy to the noise power ($N_0$ represents thermal noise plus interference). The interference experienced by a CDMA user depends on the correlation properties of the spreading codes. However, the total interference is modeled as additive noise without considering the special correlation properties. This is an accepted approximation since the spreading codes on the reverse link form a non-orthogonal set. Mobility further destroys possible synchronization among the various coding chips.

(2) A log-normal attenuation model is used to define shadowing or slow fading. The path loss between the subscriber and the cell site is proportional to $10^{\xi/10}d^{-4}$, where d is the distance from the subscriber to the cell site and $\xi$ is a Gaussian random variable with standard deviation $\sigma\xi=8$ db and zero mean. The model assumes that Rayleigh fading errors (due to multipath propagation) are accounted for by bit-interleaving, error correcting codes, and multi-antenna diversity. The effects of Rayleigh fading are subsumed in the $E_b/N_0$ requirement.

(3) The received power levels of the voice users and data users ($S_v$ and $S_{d,i}$, $\forall i=1, \ldots C$, respectively) in a fully loaded system with maximally shrunk cells (no cell-breathing) are allowed to differ. As is known in the art, different received power levels cause the problem of capture due to the near-far effect in a packet radio scenario, in which the receiver despreads the strongest frame received. However, in a system such as IS-95, once a code has been assigned to a user, the receiver despreads the user signal with the designated spreading code alone.

(4) The activity variables, i.e., the proportion of time that a user is active, are referred to herein as $\psi_v$ for voice users and $\psi_{d,i}$ for class i data users and are modeled as binomially distributed random variables with $P(\psi_v=1)=\alpha_v$ and $P(\psi_{d,i}=1)=\alpha_{d,i}$, $\forall i=1 \ldots C$.

(5) Processing gains for voice and data users is given by W/B, where W is the spread spectrum bandwidth and B is the nominal transmission rate for a single code, e.g., 9.6 kbps. The processing gain for all codes is assumed to be equal.

(6) The sectorization in all cells is perfect.

Perfect Power Control and Uniform User Distribution

Figure 3:
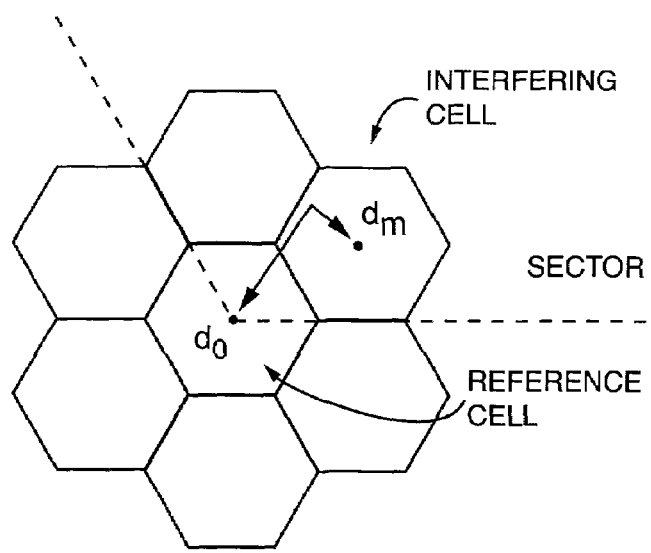
FIG. 3 illustrates cell sector geometry consistent with the present invention.

In a method for analyzing CDMA capacity consistent with the present invention, the users are assumed to be uniformly distributed over the area shown in FIG. 3. The method also assumes perfect power control. Because the FER is directly related to the received power ratio $E_b/N_0$, the SAP can be computed by quantifying the statistical variations in $E_b/N_0$. The interference power is comprised of thermal noise power $\eta$, total interference due to voice users in other cells $I_v$, total interference due to data users in other cells $I_{d,i}$, $i=1 \ldots C$, and interference from voice and data users within the reference cell. The $E_b/N_0$ ratio for class i data users is:

$$\left(\frac{E_b}{N_0}\right)_{d,i} = \qquad (1)$$

$$\left(\frac{W}{B}\right)/\left(\sum_{j=1}^{N_v}\psi_{v,j}\frac{S_v}{S_{d,i}} + \sum_{k=1,k\neq i}^{C}\sum_{j=1}^{N_{d,k}}\psi_{d,k,j}r_{d,k}\frac{S_{d,k}}{S_{d,i}} + \sum_{j=1}^{N_{d,i}}\psi_{d,i,j}r_{d,i} + (r_{d,i}-1) + \sum_{k=1}^{C}\frac{I_{d,k}}{S_{d,i}} + \frac{I_v}{S_{d,i}} + \frac{\eta}{S_{d,i}}\right)$$

The first term in the denominator represents interference from voice users in the reference cell. The second term represents interference due to data users within the reference cell. The third term represents self-interference. The last term includes data and voice interference from other cells and the thermal noise power. Similarly, the $E_b/N_0$ ratio for voice users is:

$$\left(\frac{E_b}{N_0}\right)_v = \qquad (2)$$

$$\left(\frac{W}{B}\right)1/\left(\sum_{j=1}^{N_v-1}\psi_{v,j} + \sum_{k=1}^{C}\sum_{j=1}^{N_{d,k}}\psi_{d,k,j}r_{d,k}\frac{S_{d,k}}{S_v} + \sum_{k=1}^{C}\frac{I_{d,k}}{S_{d,i}} + \frac{I_v}{S_v} + \frac{\eta}{S_v}\right),$$

which is similar to $E_b/N_0$ for data users, but without self-interference.

All quantities in equations (1) and (2) are deterministic, except the interference from other cells $I_d/S$ and $I_v/S$. From the log-normal assumption and assuming that path loss varies as the inverse fourth power of distance, d, the interference from other cells can be expressed as $$\frac{I_{d,i}}{S_{d,i}}(d_0, d_m) = r_{d,i}\left(\frac{d_m}{d_0}\right)^4 \times 10^{\frac{\xi_{d,0} - \xi_{d,m}}{10}} \quad (3)$$

$$\frac{I_v}{S_v}(d_0, d_m) = \left(\frac{d_m}{d_0}\right)^4 \times 10^{\frac{\xi_{d,0} - \xi_{d,m}}{10}} \quad (4)$$

where $d_0$ is the distance from a mobile unit in the interfering cell to the base station in the reference cell, and $d_m$ is the distance from a mobile unit in the interfering cell to the base station in the interfering cell. $\xi_{d,0}$, $\xi_{v,0}$ and $\xi_{d,m}$, $\xi_{v,m}$ are independent so that the differences have zero mean and variance $2\sigma_\xi^2$. The densities of the interfering codes are given by: $\rho_v = 2N_v/\sqrt{3}$ voice codes per unit area and $\rho_{d,i} = 2N_{d,i}r_{d,i}/\sqrt{3}$ data codes of class i per unit area. The total interference ratio due to other cells can now be expressed as:

$$\frac{I_{d,i}}{S_{d,i}} = r_{d,i} \int\int_{Area} \Psi_{d,i}\left(\left(\frac{d_m}{d_0}\right)^4 \left(10^{\frac{\xi_{d,0} - \xi_{d,m}}{10}}\phi\right)\xi_{d,0} - \xi_{d,m}, \frac{d_0}{r_m}\right)\rho_{d,i}dA \quad (5)$$

$$\frac{I_v}{S_v} = \int\int_{Area} \Psi_v\left(\left(\frac{d_m}{d_0}\right)^4 \left(10^{\frac{\xi_{v,0} - \xi_{v,m}}{10}}\phi\right)\xi_{v,0} - \xi_{d,m}, \frac{d_0}{d_m}\right)\rho_v dA \quad (6)$$

where $$\phi\left(\xi_0 - \xi_m, \frac{d_0}{d_m}\right) = 1 \text{ if } \left(\frac{d_m}{d_0}\right)^4 \times \left(10^{\frac{\xi_0 - \xi_m}{10}}\right) \leq 1 \quad (7)$$

$$= 0 \text{ otherwise}$$

=0 otherwise where, $d_m = \min_{k \neq 0} d_k$, is the shortest distance between base station k and a mobile unit. The area of integration is the sector shown in FIG. 3.

As described in Gilhousen, the moments of the other cell interference random variables defined in equations (4) and (5) are:

$$E\left(\frac{I_{d,i}}{S_{d,i}}\right) = \int\int_{area}\left(\frac{d_m}{d_0}\right)^4 E\left[\Psi_{d,i}10^{\chi_d/10}\phi\left(\chi_d,\frac{d_0}{d_m}\right)\right]\rho_{d,i}dA \quad (8)$$

$$= \int\int_{area}\alpha_{d,i}\left(\frac{d_m}{d_0}\right)^4 f\left(\frac{d_m}{d_0}\right)\rho_{d,i}dA$$

$$E\left(\frac{I_v}{S_v}\right) = \int\int_{area}\left(\frac{d_m}{d_0}\right)^4 E\left[\Psi_v 10^{\chi_v/10}\phi\left(\chi_v,\frac{d_0}{d_m}\right)\right]\rho_v dA \quad (9)$$

$$= \int\int_{area}\alpha_v\left(\frac{d_m}{d_0}\right)^4 f\left(\frac{d_m}{d_0}\right)\rho_v dA$$

where $$f\left(\frac{d_m}{d_0}\right) = \quad (10)$$

$$\exp\left[\left(\sigma_\xi\frac{\ln 10}{10}\right)^2\right]\left[1 - Q\left[40\log_{10}\gamma_0 \Big/ \sqrt{2\sigma_\xi^2} - \sqrt{2\sigma_\xi^2}\frac{\ln 10}{10}\right]\right]$$

where and $\chi_{d,i} = \xi_{d,0} - \xi_{d,m}$ and $\chi_v = \xi_{v,0} - \xi_{v,m}$ are Gaussian random variables with zero mean and $2\sigma_\xi^2$ variance, with $\phi(\chi, d_0 d_m)$ defined by equation (7). Q[.] is the complementary error function.

The integrals in equations (8) and (9) are over the 2-D area shown in FIG. 3. As described in Gilhousen et al., the integrals may be numerically evaluated for $\sigma_\xi = 8$ db. The resulting bounds for $\alpha_v = 3/8$, which has been shown by experiments and field trials to be a suitable value are:

$$E\left[\frac{I_v}{S_v}\right] \leq 0.247 N_v \cong m_v; E\left[\frac{I_v}{S_{d,i}}\right] \leq \frac{S_v}{S_{d,i}} \times m_v \quad (11)$$

$$E\left[\frac{I_{d,i}}{S_d}\right] \leq \frac{0.247}{\alpha_v/\alpha_{d,i}} N_{d,i}r_{d,i} \cong m_{d,i}; E\left[\frac{I_{d,i}}{S_v}\right] \leq \frac{S_{d,i}}{S_v} \times m_{d,i}$$

The calculations of second moments of $I_{d,i}S_{d,i}$ and $I_v/S_v$ are similar to the calculation described in Gilhousen:

$$\text{var}\left(\frac{I_v}{S_v}\right) \leq \int\int_{Area}\left(\frac{d_m}{d_0}\right)^8\left[\alpha_v \times g\left(\frac{d_m}{d_0}\right) - \alpha_v^2 \times f^2\left(\frac{d_m}{d_0}\right)\right]\rho_v dA \quad (12)$$

$$\text{var}\left(\frac{I_{d,i}}{S_{d,i}}\right) \leq \int\int_{Area}\left(\frac{d_m}{d_0}\right)^8\left[\alpha_{d,i} \times g\left(\frac{d_m}{d_0}\right) - \alpha_{d,i}^2 \times f^2\left(\frac{d_m}{d_0}\right)\right]\rho_v dA \quad (13)$$

where, $$g\left(\frac{r_m}{r_0}\right) = \exp\left[\left(\sigma_\xi\frac{\ln 10}{5}\right)^2\right]\left[1 - Q\left[\frac{40\log_{10}r_0/r_m}{\sqrt{2\sigma_\xi^2}} - \sqrt{2\sigma_\xi^2}\frac{\ln 10}{5}\right]\right] \quad (14)$$

Evaluating numerically over the area for $\sigma = 8$ db, bounds may be computed for the variances:

$$\text{var}\left(\frac{I_v}{S_v}\right) \leq 0.078 N_v \cong \sigma_v^2; \text{var}\left[\frac{I_v}{S_{d,i}}\right] \leq \frac{S_v^2}{S_{d,i}^2} \times \sigma_v^2 \quad (15)$$

$$\text{var}\left[\frac{I_{d,i}}{S_{d,i}}\right] \leq \frac{0.078}{\alpha_v/\alpha_{d,i}}N_{d,i}r_{d,i} \cong \sigma 2_{d,i}; \text{var}\left[\frac{I_{d,i}}{S_v}\right] \leq \frac{S_{d,i}^2}{S_v^2} \times \sigma_{d,i}^2$$

Note that the bound on variance for interference due to data variables is valid for $\alpha(d, i) \geq \alpha_v$. Since $I_{d,t}/S_{d,t}$ and $I_v/S_v$ are linear functionals of a 2-D white random process, they are well modeled by a Gaussian random variable with means and variances bounded by equations (11) and (15).

The SAP for voice and data is defined as follows:

$$SAP_v[\gamma_v] \cong P_v = Prob[FER_v \leq \text{Threshold}] = Prob\left[\left(\frac{E_b}{N_0}\right)_v \geq \gamma_v\right] \quad (16)$$

$$SAP_{d,i}[\gamma_{d,i}] \cong P_{d,i} = Prob[FER_{d,i} \leq \text{Threshold}] = Prob\left[\left(\frac{E_b}{N_0}\right)_{d,i} \geq \gamma_{d,i}\right] \quad (17)$$

or, $$1 - P_v = Prob\left[\sum_{j=1}^{N_v-1}\Psi_{v,j} + \sum_{k=1}^{C}\sum_{j=1}^{N_{d,k}}\Psi_{d,k,j}r_{d,k}\frac{S_{d,k}}{S_v} + \sum_{k=1}^{C}\frac{I_{d,k}}{S_{d,i}} > \delta_v\right] \quad (18)$$

$$\text{where } \delta_v = \frac{W/B}{\gamma_v} - \frac{\eta}{S_v} \quad (19)$$

$$1 - P_d = Prob\left[\sum_{j=1}^{N_v}\Psi_{v,j}\frac{S_v}{S_{d,i}} + \sum_{k=1,k\neq i}^{C}\sum_{j=1}^{N_{d,k}}\Psi_{d,k}r_{d,k}\frac{S_{d,k}}{S_{d,i}} + \right. \quad (20)$$

$$\left. \sum_{j=1}^{N_{d,i}}\Psi_{d,i,j}r_{d,i} + \sum_{k=1}^{C}\frac{I_{d,k}}{S_{d,i}} + \frac{I_v}{S_{d,i}} + \frac{\eta}{S_{d,i}} > \delta_d\right]$$

$$\text{where } \delta_{d,i} = \frac{W/R_d}{\Upsilon_{d,i}} - \frac{\eta}{S_{d,i}} - (r_{d,i} - 1) \quad (21)$$

Since $\psi_{d,i}$ and $\psi_v$ are binomially distributed, and $$\sum_{t=1}^{C}\frac{I_{d,t} + I_v}{S}$$

is the sum of independent Gaussian random variables, equations (18) and (20) can be written as:

$$1 - P_v = \sum_{k_{d,C}=0}^{N_{d,C}} \cdots \sum_{k_{d,1}=0}^{N_{d,1}}\sum_{k_v=0}^{N_v-1}\prod_{j=1}^{C}F_{d,j}(k_{d,j}, N_{d,j})F_v(k_v, N_v - 1) \times \quad (22)$$

$$Q\left[\frac{\delta_v - k_v\sum_{j=1}^{C}k_{d,j}\frac{S_{d,j}}{S_v} - \left(m_v + \sum_{j=1}^{C}m_{d,j} \times \frac{S_{d,j}}{S_v}\right)}{\sqrt{\sigma_v^2 + \sum_{j=1}^{C}\frac{S_{d,j}^2}{S_v^2}\times\sigma_{d,j}^2}}\right]$$

$$1 - P_{d,i} = \sum_{k_{d,C}=0}^{N_{d,C}} \cdots \sum_{k_{d,i}=0}^{N_{d,i}-1}\sum_{k_v=0}^{N_v}\prod_{j=1,j\neq i}^{C}F_{d,j}(k_{d,j}, N_{d,j})F_v(k_v, N_v) \times \quad (23)$$

$$F_{d,i}(k_{d,i}N_{d,i} - 1) \times$$

$$Q\left[\frac{\delta_{d,i} - k_v\frac{S_v}{S_{d,i}} - \sum_{j=1}^{C}k_{d,i}\frac{S_{d,j}}{S_{d,i}} - \left(m_v\frac{S_v}{S_{d,i}} + \sum_{j=1}^{C}m_{d,j} \times \frac{S_{d,j}}{S_{d,i}}\right)}{\sqrt{\sigma_v^2 + \sum_{j=1}^{C}\frac{S_{d,j}^2}{S_v^2}\times\sigma_{d,j}^2}}\right]$$

$$\text{where } F_{d,i}(a, b) = \frac{b!}{(a!)(b!)}\alpha_{d,i}^a(1 - \alpha_{d,i})^{b-a}.$$

In methods consistent with the present invention, equations (22) and (23) can be used in determining the capacity ($N_v$, $N_d$). As will be described below in the Coverage and Received Power Levels section, the received power level settings $S_v$, and $S_{d,i}$ can be determined based on a simple link budget analysis that accounts for coverage limitations resulting from limited handset transmission powers. After determining the received power level settings, the SAP measures in equations (22) and (23) depend only on the number of voice and data users in the system.

Imperfect Power Control and Distribution of Users at Sector Edges

In another method for analyzing CDMA capacity consistent with the present invention, the effects of imperfect power control and a non-uniform user distribution are considered. As shown in Viterbi et al., Cameron et al., and Priscoli et al., variations in the received power levels in multi-code CDMA systems, due to imperfections in the control loop, are well modeled as log-normal random variables. Therefore, if S is the required received power level for a voice user or a HSD user (from any of C classes of HSD users), the actual received power is given by $S \times e^{\beta X}$, where $\beta = \ln(10)/10$ and X is a Gaussian random variable with zero mean and variance $\sigma_X^2$. The mean of the log-normal random variable $e^{\beta X}$ is defined to be $m_1$ and the variance $\sigma_1^2$.

The method assumes a user distribution with all voice and data users located along the edges of the sector shown in FIG. 3. The number of users of each class is assumed to be the same in every sector. The method also assumes a fixed base station assignment for each user. Since the distance of the mobiles located at the boundaries from the interfering base station and the reference base station are the same, the received power from the interfering mobiles at the reference base station is assumed to be distributed identically to the power received at the interfering base.

The SAP equation for the class of voice users or any of the C classes of data users is:

$$1 - P = Prob\left[\frac{\frac{W}{B}e^{(\beta X)}S}{I_{in} + I_{out} + \eta} < \gamma\right] \quad (24)$$

where, $I_{in}$, is the in-cell interference, $I_{out}$ is the out-of-cell interference, and $\eta$ is the thermal noise power. Note that $I_{in}$, depends on the class of the user, but $I_{out}$ is the same for all classes of users. $I_{in}$ and $I_{out}$ are random variables. Defining $$g = \frac{\gamma}{W/B} \tag{*}$$

and $A=I_{in}+I_{out}+\eta$, equation (24) can be written as:

$$1 - P = Prob\left[X < \frac{1}{\beta}\ln\left(\frac{g}{S}A\right)\right] \tag{25}$$

$$= 1 - \int_0^\infty Q\left[\frac{\frac{1}{\beta}\ln\left(\frac{g}{S}a\right)}{\sqrt{\sigma_X^2}}\right]f_A(a)dA \tag{26}$$

It has been shown that if θ is a random variable and P(θ) is a real function of θ, then the mean E[P(θ)] is well approximated by $$E[P(\theta)] \approx \frac{2}{3}P(\mu) + \frac{1}{6}P(\mu + \sqrt{3}\,\sigma) + \frac{1}{6}P(\mu + \sqrt{3}\,\sigma)$$

(J. M. Holtzman, "A simple, accurate method to calculate spread spectrum error probabilities," *IEEE Transactions on Communications*, vol. 40, pp. 461–464, March, 1992, which is hereby incorporated by reference). This approximation is fairly robust and holds under very general conditions. The approximation is exact when the function is a fifth degree polynomial and the random variable A is Gaussian. Using this approximation on the Q function in equation (26):

$$1 - P \approx 1 - \frac{2}{3}Q\left[\frac{\frac{1}{\beta}\ln\left(\frac{g}{S}\mu_A\right)}{\sqrt{\sigma_X^2}}\right] - \tag{27}$$

$$\frac{1}{6}Q\left[\frac{\frac{1}{\beta}\ln\left(\frac{g}{S}(\mu_A + \sqrt{3}\,\sigma_A)\right)}{\sqrt{\sigma_X^2}}\right] - \frac{1}{6}\left[\frac{\frac{1}{\beta}\ln\left(\frac{g}{S}\mu_A - \sqrt{3}\,\sigma_A\right)}{\sqrt{\sigma_X^2}}\right]$$

where, $\mu_A = E[I_{in}] + E[I_{out}] = \eta$ \quad (28)

$\sigma_A^2 = Var[I_{in}] + Var[I_{out}]$ (29)

The in-cell interference for voice users $I_{v,in}$ and for class i data users $I_{d,in}$ is given by:

$$I_{v,in} = \sum_{j=1}^{N_v-1} \Psi_{v,j}S_v e^{\beta X_{v,j}} + \sum_{k=1}^{C}\sum_{j=1}^{N_{d,k}} \Psi_{d,k,j}r_{d,k}S_{d,k}e^{\beta X_{d,k,j}} \tag{30}$$

$$I_{d,in} = \sum_{j=1}^{N_v} \Psi_{v,j}S_v e^{\beta X_{v,j}} + \sum_{k=1,k\ne i}^{C}\sum_{j=1}^{N_{d,k}} \Psi_{d,k,j}r_{d,k}S_{d,k}e^{\beta X_{d,k,j}} + \tag{31}$$

$$\sum_{j=1}^{N_{d,i}-1}\Psi_{d,i,j}r_{d,i}S_{d,i}e^{\beta X_{d,i,j}} + (r_{d,i}-1)S_{d,i}e^{\beta X_d}$$

The out-of-cell interference is:

$$I_{out} = \sum_{j=1}^{N_v}\Psi_{v,j}S_v e^{\beta X_{v,j}} + \sum_{k=1}^{C}\sum_{j=1}^{N_{d,k}}\Psi_{d,k,j}r_{d,k}S_{d,k}e^{\beta X_{d,k,j}} \tag{32}$$

The SAP in equation (26) depends on the means and variances of the random variable A. The SAP determination for the multi-class case is simple, as the random variables constituting $I_{in}$ and $I_{out}$ are all independent. The X variables modeling the power control imperfections are independent and identically distributed.

Coverage and Received Power Levels

In a fully loaded system with maximally shrunk cells (i.e., no cell breathing), the received power levels needed to determine system capacity for a given SAP are constrained by two factors: the peak transmit power (per code) for each user and the maximum loss due to fading that can occur within the cell. The power limitations are usually determined by equipment specifications, while the maximum loss is usually recorded through propagation measurements.

A method consistent with the present invention determines the received power levels through a simple link analysis under maximum loading and uniform coverage conditions for all classes of users. Let PL denote the maximum loss that can occur in a cell. This includes loss due to fading, as well as antenna and transmission losses. The peak transmit power of all voice handsets $S_v(T_x)$ is assumed to be fixed. The received voice frame power $S_v(R_x)$ is derived from PL and the maximum transmit power $S_v(T_x)$: $S_v(R_x)$ (dbm)=$S_v(T_x)$(dbm)−PL(dbm). The class i data user received power levels $S_{d,i}(R_x)$ are preferably set at some multiple of this received voice frame power.

CAPACITY EXAMPLE

Examples of methods for capacity analysis of a system with voice users and a single class of data users consistent with the present invention will now be presented. If perfect power control and a uniform user distribution is assumed, then SAP equations (22) and (23) become:

$$1 - P_v = \sum_{k_d=0}^{N_d}\sum_{k_v=0}^{N_v-1} F_d(k_d, N_d)F_v(k_v, N_v - 1) \times \tag{33}$$

$$Q\left[\frac{\delta_v - k_v - k_d r_d\frac{S_d}{S_v} - \left(m_v + m_d \times \frac{S_{d,i}}{S_v}\right)}{\sqrt{\sigma_v^2 + \frac{S_d^2}{S_v^2}\times\sigma_d^2}}\right]$$

$$1 - P_d = \sum_{k_d=0}^{N_d}\sum_{k_v=0}^{N_v} F_v(k_v, N_v)F_d(k_d, N_d - 1) \times \tag{34}$$

-continued $$Q\left[\frac{\delta_d - k_v\left(\frac{S_v}{S_d}\right) - k_d r_d - \left(m_v\left(\frac{S_v}{S_d}\right) + m_d\right)}{\sqrt{\sigma_d^2 + \frac{S_v^2}{S_d^2} \times \sigma_v^2}}\right]$$

For an imperfectly power controlled system and with all the users located at the edge of the cells, the SAP for the voice and data users can be computed using equations (27)–(29). The means and variances are:

$$E[I_{v,in}] = (N_v - 1)\alpha_v S_v m_1 + N_d \alpha_d S_d r_d m_1 \qquad (35)$$

$$E[I_{d,in}] = N_v \alpha_v S_v m_1 + (N_d - 1)\alpha_d S_d r_d m_1 + (r_d - 1) S_d m_1 \qquad (36)$$

$$\text{Var}[I_v, in] = \qquad (37)$$
$$(N_v - 1)(\alpha_v(1 - \alpha_v) + \alpha_v^2)(\sigma_1^2 + m_1^2)S_v^2 + (N_v - 1)\sigma_v^2 S_v^2 m_1^2 +$$
$$N_d(\alpha_d(1 - \alpha_d) + \alpha_d^2)(\sigma_1^2 + m_1^2)S_d^2 r_d^2 + N_d \alpha_d^2 m_1^2 S_d^2 r_s^2$$

$$\text{Var}[I_d, in] = N_v(\alpha_v(1 - \alpha_v) + \alpha_v^2)(\sigma_1^2 + m_1^2)S_v^2 - N_v \alpha_v^2 S_v^2 m_1^2 + \qquad (38)$$
$$(N_d - 1)(\alpha_d(1 - \alpha_d) + \alpha_d^2)(\sigma_1^2 + m_1^2)S_d^2 r_d^2 - (N_d - 1)\alpha_d^2 m_1^2 S_d^2 r_s^2 +$$

The mean and variance of the out-of-cell-interference is computed as:

$$E[I_{out}] = N_v \alpha_v S_v m_1 + N_d \alpha_d S_d r_d m_1 \qquad (39)$$

$$\text{Var}[I_{out}] = N_v(\alpha_v(1 - \alpha_v) + \alpha_v^2)(\sigma_1^2 + m_1^2)S_v^2 + N_v \alpha_v^2 m_1^2 S_v^2 + \qquad (40)$$
$$N_d(\alpha_d(1 - \alpha_d) + \alpha_d^2)(\sigma_1^2 + m_1^2)S_d^2 r_d^2 + N_d \alpha_d^2 m_1^2 S_d^2 r_s^2$$

In a method consistent with the present invention, the capacity of a CDMA system, i.e., the number of voice users $N_v$ and the number of data users $N_{d,i}$ for each data class i, can be determined by equations (22) and (23) (uniform distribution, perfect power control) or by equations (27)–(29) (users at cell edges, imperfect power control). For the perfect power control method, $N_v$ and $N_{d,i}$ can be determined when the activity variables and QoS requirements are known for each user class and the maximum received power levels are determined. For the imperfect power control method, the variance of the random variable X used to estimate the actual received power must also be known.

Figure 4:
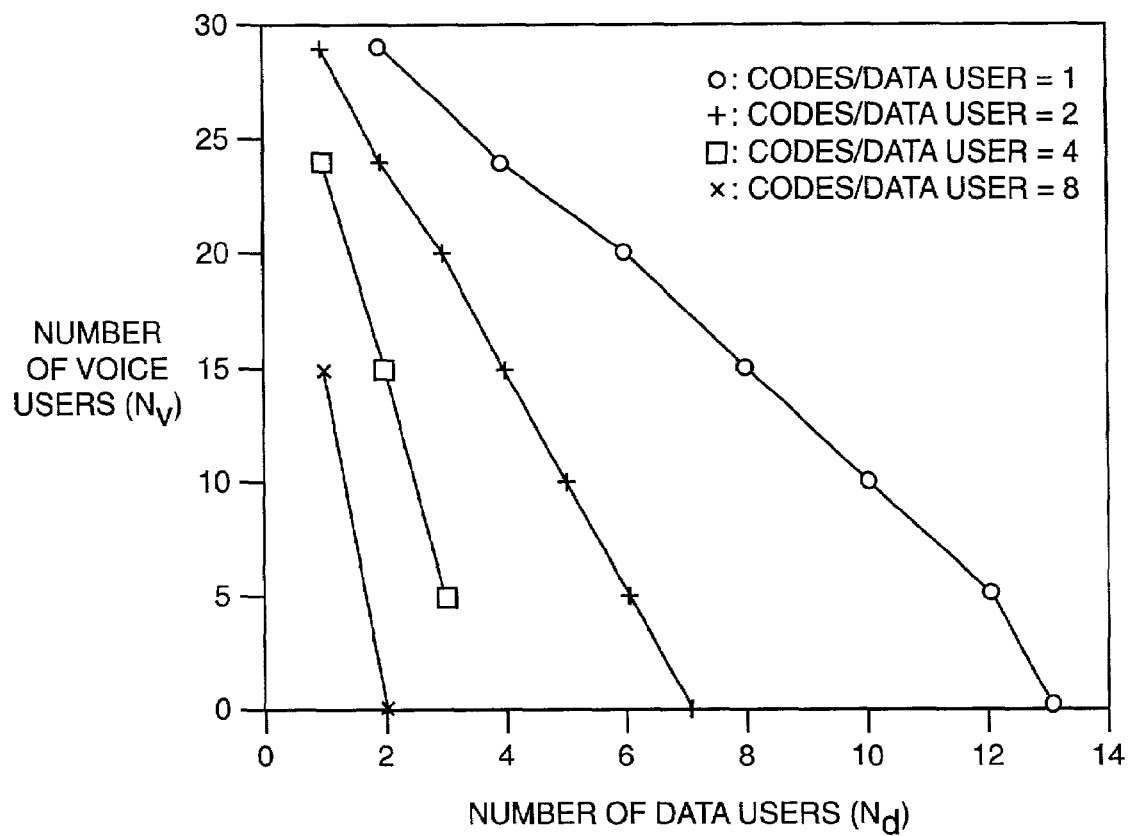
FIG. 4 illustrates the results of a method for determining cellular network capacity consistent with the present invention.
Figure 5:
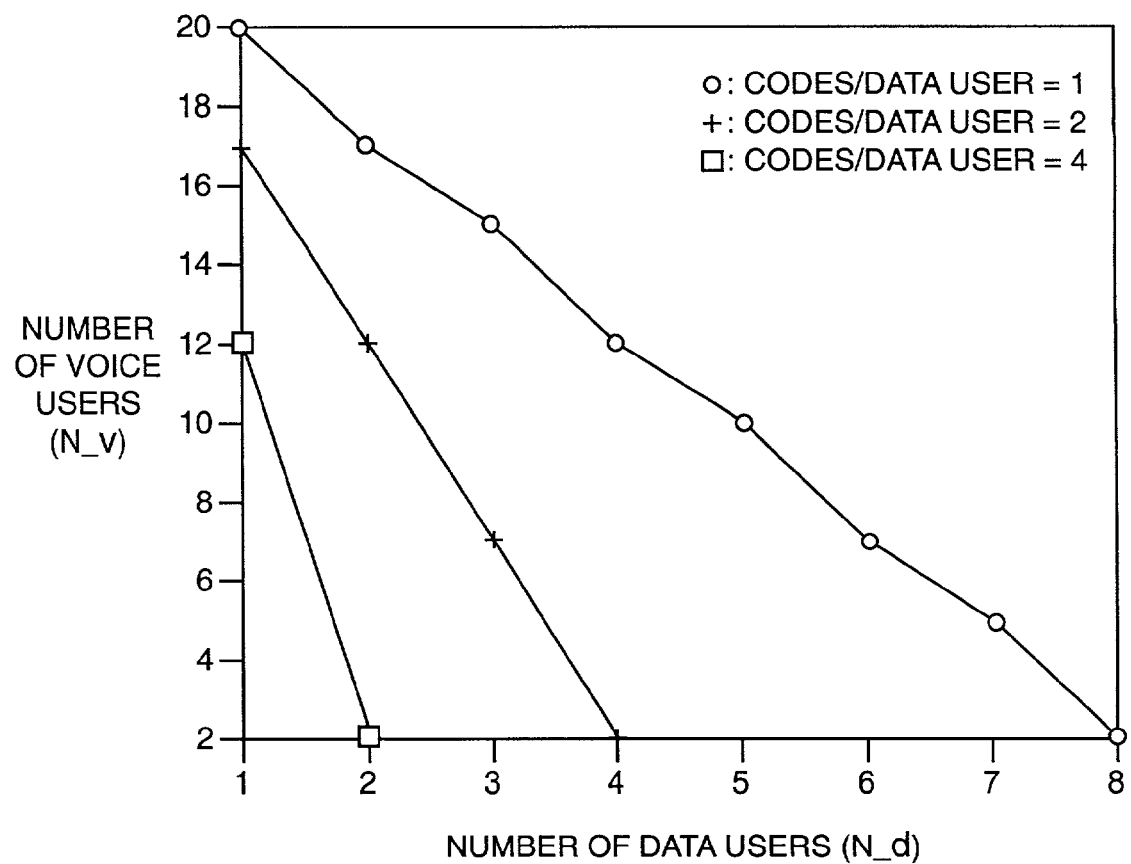
FIG. 5 illustrates the results of a second method for determining cellular network capacity consistent with the present invention.
Figure 6:
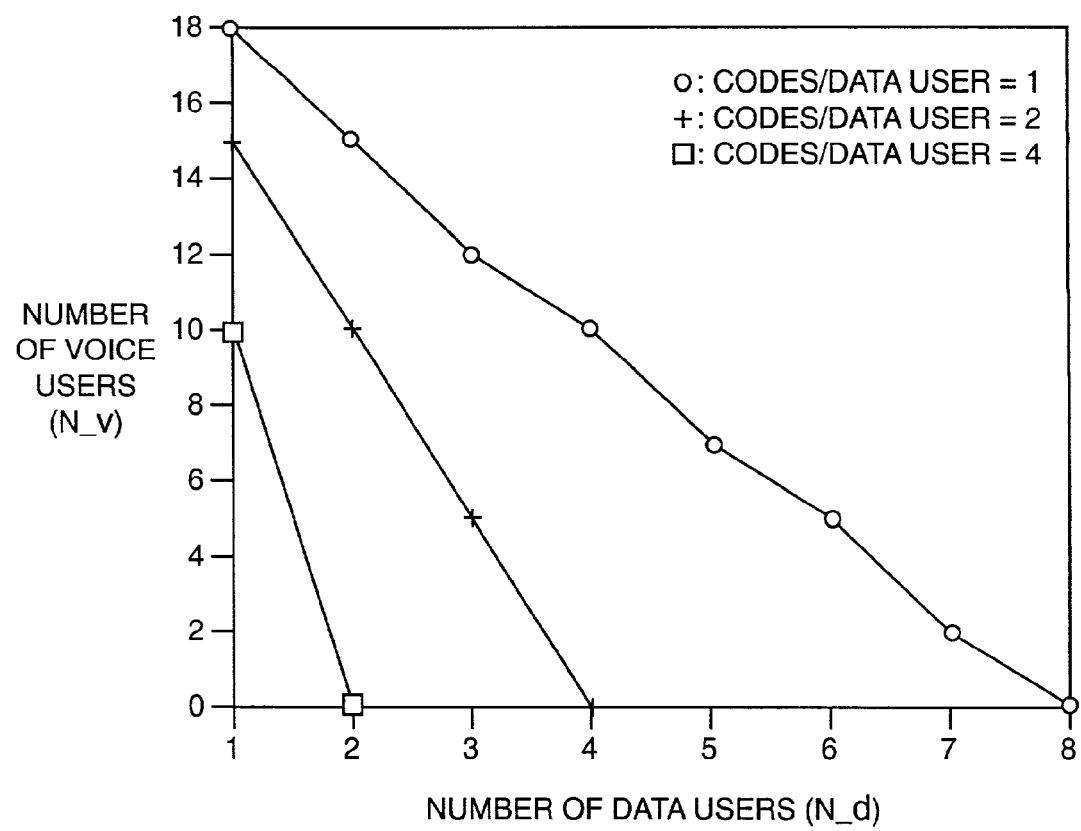
FIG. 6 illustrates another set of results of the second method for determining cellular network capacity consistent with the present invention.

FIGS. 4–6 illustrate the results of methods consistent with the present invention for determining capacity of a system with the following parameters and settings. Conventional cellular systems such as IS-95A use a 1.228 MHz CDMA channel with a basic transmission rate for a single code of 9.6 kbps or 14.4 kbps. For exemplary purposes, the basic rate will be assumed to be 9.6 kbps, which gives the system a processing gain of 128. The maximum loss (due to fading and transmission) is set at −130 db. For a path loss of −130 db, the empirical estimate of cell size obtained from a well-known model (the Hata model for urban environments with base antenna height=30 m and mobile antenna height=3 m) would be about 1.5 km. Conventional CDMA voice handsets have a peak transmit power capability of 200 mW.

For a cell with maximum losses of −130 db, the maximum received power from a voice user located at the edge of the cell would be −106.98 dbm. The required received power of all voice users is set at −106.98 dbm for exemplary purposes to ensure uniform coverage for all users in a maximally loaded cell. The required received powers for data transmissions are assumed to be equal to voice power (assuming the same SAP and FER requirements for voice and data transmissions). The FER and SAP for both voice and data users are set at 1% and 90%, respectively. Experimental results have shown that for this QoS, an $E_b/N_0$ of 7 db is required (R. Padovani, "Reverse link performance of IS-95 based cellular systems," *IEEE Personal Communications*, no. 3, pp. 28–34, 1994, which is hereby incorporated by reference). Finally, the voice activity factor is assumed to be 3/8 while the data activity factor is assumed to be 1 (dedicated bandwidth). The noise power at 800 MHz is approximately −108 dbm.

FIG. 4 shows the results of the method with perfect power control and uniform user distribution. Equations (33) and (34) are used to determine the number of voice users versus the number of data users of a single class. Results are shown when the number of codes per data user is set at 1, 2, 4, and 8.

FIGS. 5 and 6 provide the capacity estimate derived using a method consistent with the present invention with imperfect power control and user location along cell boundaries, for standard deviations of 0.5 db and 1.5 db in the power control, respectively. Equations (35)–(40) are used to determine the number of voice users versus the number of data users of a single class. Results are shown when the number of codes per data user is set at 1, 2, and 4.

The effect of introducing a high speed data service on the voice capacity is of primary concern to most cellular service providers. The loss in voice capacity due to imperfections in power control and user distribution can be high as seen in FIGS. 5 and 6. The slope of the decline in available voice capacity increases as the rate of the data users in the system increases, implying that HSD users using m codes affect the voice capacity more adversely than m data users using a single code.

Admission Control

Consistent with the present invention, an admission control methodology utilizes the relationship between capacity and QoS requirements described above. Admission control is the process by which the cellular network determines whether a new user can be admitted to the network and controls certain aspects of the network in order to allow admittance of new users. As shown in equations (22) and (23) and (27)–(29), the maximum number of voice and data users that the network can support is determined by the users' QoS requirements, their received power levels, and their activity levels. As will now be explained, the cellular network can control each of these to enhance the capacity of the network.

QoS Control

Figure 7:
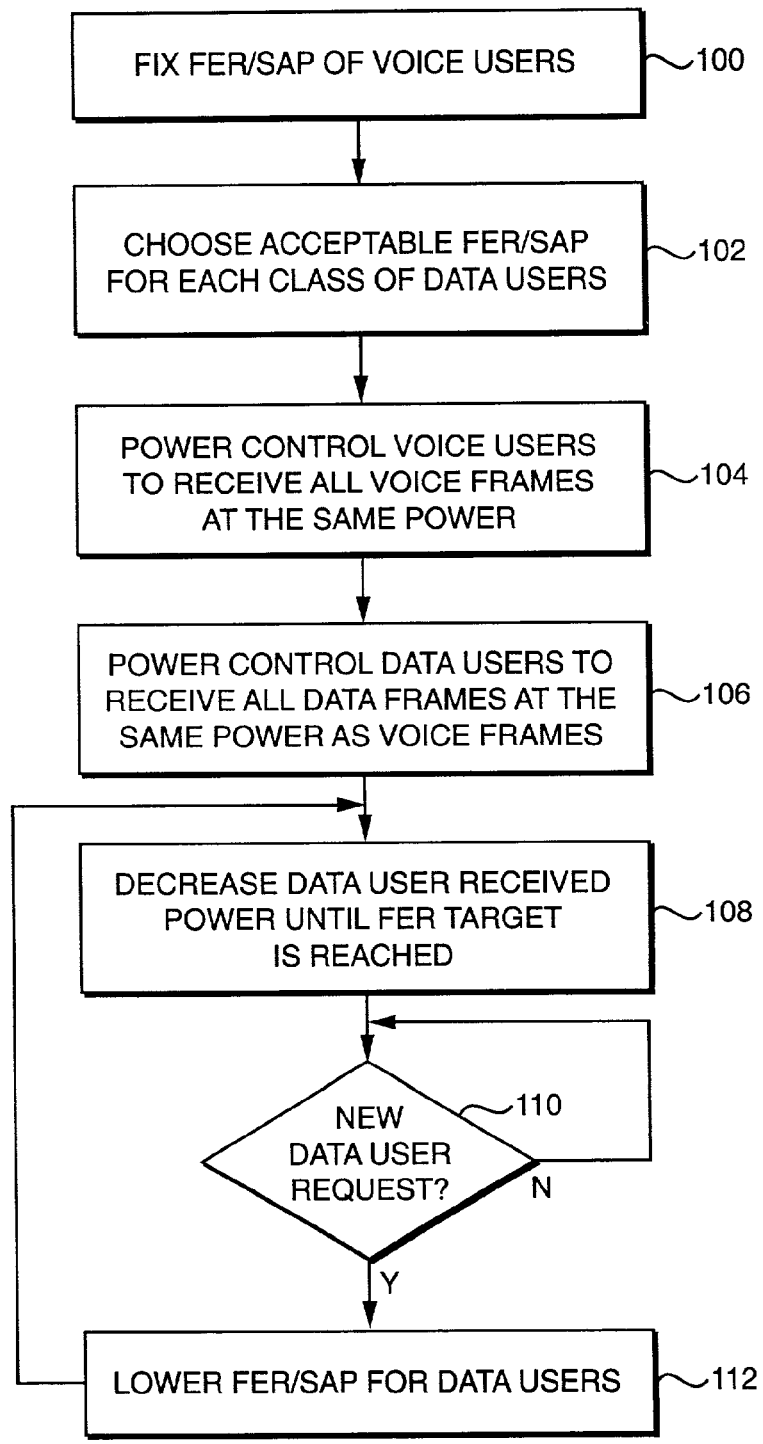
FIG. 7 is a flowchart illustrating the steps of a method for enhancing cellular network capacity consistent with the present invention.

FIG. 7 illustrates a method for enhancing CDMA cellular network capacity consistent with the present invention by controlling the QoS of data users. First, the QoS (FER and SAP) of voice users is fixed (step 100). Usually step 100 will be performed at MSC 10 (executed by processor 14) (FIG. 2), where software for changing the FER and SAP will usually reside. Alternatively, step 100 may be performed at base station 20 (executed by processor 24) (FIG. 2). Next, the method chooses acceptable FER and SAP values for data users (step 102) using the equations provided by the capacity model. The current voice load and data traffic level are inputs to the capacity model. Next, the method controls the received power of voice users so that all voice frames are received at equal power (step 104). This is accomplished by executing standard up/down power control commands from the base station. Then the received power of data users is controlled so that all data frames are received at the same power as the voice frames (step 106), again accomplished by executing standard up/down power control commands from the base station. Next, the received power for data users is decreased until the FER target from step 102 is reached (step 108). The capacity model equations ((22)–(23) or (27)–(29)) are used to estimate the decrease in power necessary to satisfy the FER target. Whenever a new data user requests access to the cellular network (step 110), the FER and SAP requirements for the data users can be loosened (step 112). The received power for data users is decreased until the new FER target is reached (step 108), thereby providing spare capacity in the network and allowing more data traffic to be carried. An additional benefit of reducing the received power for data users in response to loosened QoS requirements is handset power savings, and therefore an enhanced handset battery life.

User Activity Control

In wireline networks, the allocation of bandwidth on a burst basis, through medium access and resource allocation mechanisms that control user activity, has resulted in significant improvements in capacity utilization. A method consistent with the present invention for enhancing capacity in a CDMA cellular network similarly controls user activity, specifically data user activity, in order to free up capacity for additional users desiring access to the network.

Figure 8A:
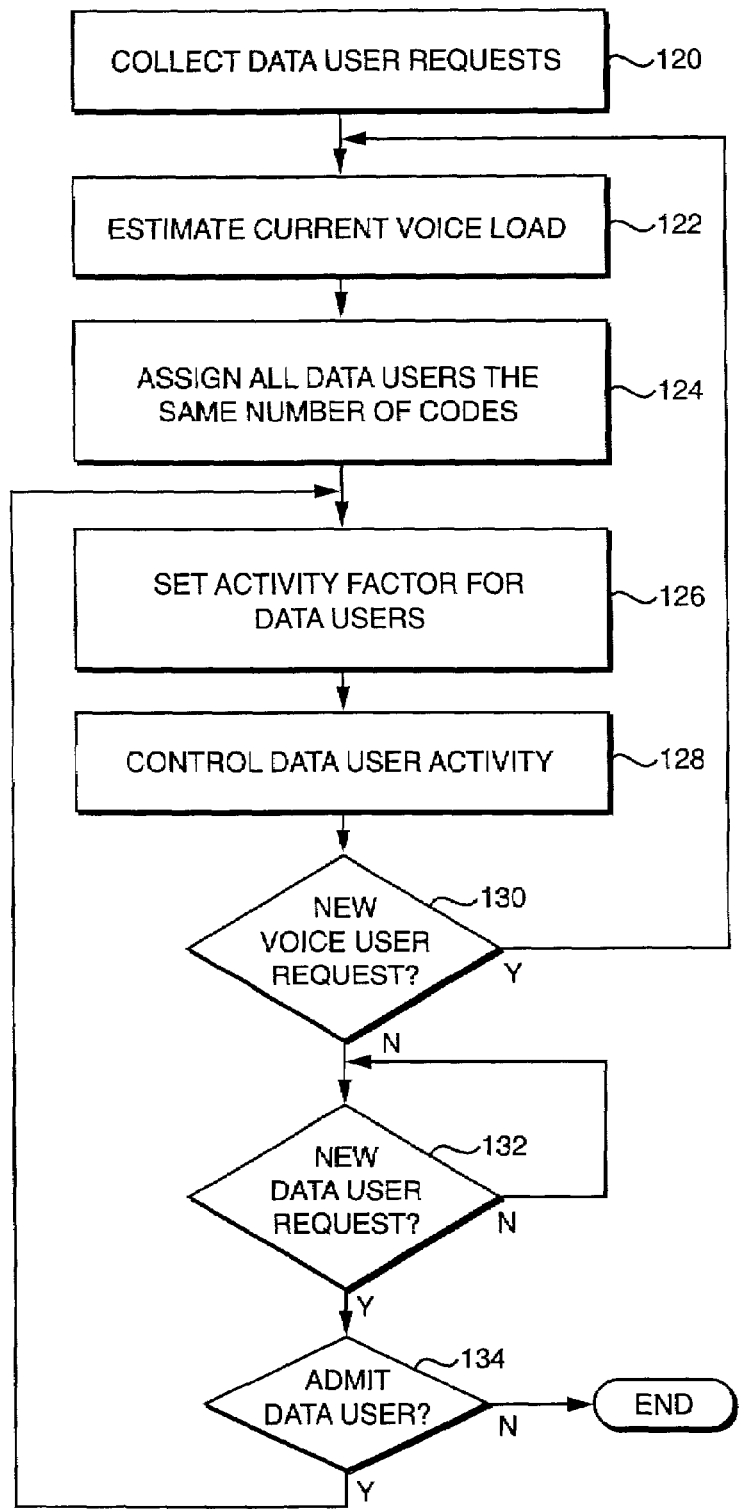
FIGS. 8A–8B are flowcharts illustrating the steps of a second method for enhancing cellular network capacity consistent with the present invention.

FIG. 8A illustrates a method for enhancing CDMA cellular network capacity consistent with the present invention by controlling the activity level of data users. First, MSC 10 collects requests for network access from data users (step 120). Next, MSC 10 estimates the current voice load based on measured voice traffic and expected traffic patterns for the time of day (step 122). Next, all data users are assigned the same number of codes (step 124). The number of codes is determined by the rate offering, e.g., 9.6 kbps, 38.6 kbps, 64 kbps. The rate offering in turn depends on the voice load and the number of data requests. For example, if the voice load is low and there are few data user requests, data users can be assigned a higher rate offering and therefore a larger number of codes. Thus the data rate offering (the number of codes assigned to each data users) is discretionary at the behest of the network controller. Next, an appropriate data activity factor is determined from the capacity model (equations (22)–(23) or (27)–(29)), given the estimated voice load and data load and the QoS targets for voice and data (step 126). Once a data activity factor has been determined, MSC 10 or base station 20 controls data user activity (step 128). This can be accomplished, for example, by transmitting a message to all data mobile units to use their codes only a percentage of time, determined by the data activity factor. Alternatively, data user activity may be controlled by randomly sending permission bits (1 or 0) from base station 20 to the data users. 1 indicates a data user can transmit using all codes. 0 indicates a data user does not have permission to transmit. The base station sends a 1 a percentage of the time, where the percentage is based on the data activity factor determined in step 126.

When the system receives a request for access from a new voice user (step 130), processing returns to step 122, where the new voice load is estimated. Data code assignment and/or data activity is then adjusted to accommodate the new voice user (steps 124–128).

When the system receives a request for access from a new data user (step 132), the system determines whether to admit the new data user based on a capacity estimate determined by the capacity model (step 134). If a limitation, such as a minimum activity factor, has been reached, the system will no longer admit new users. If the system decides to admit a new user, processing returns to step 126 to set a new data activity factor that allows new users to enter the network.

Figure 8B:
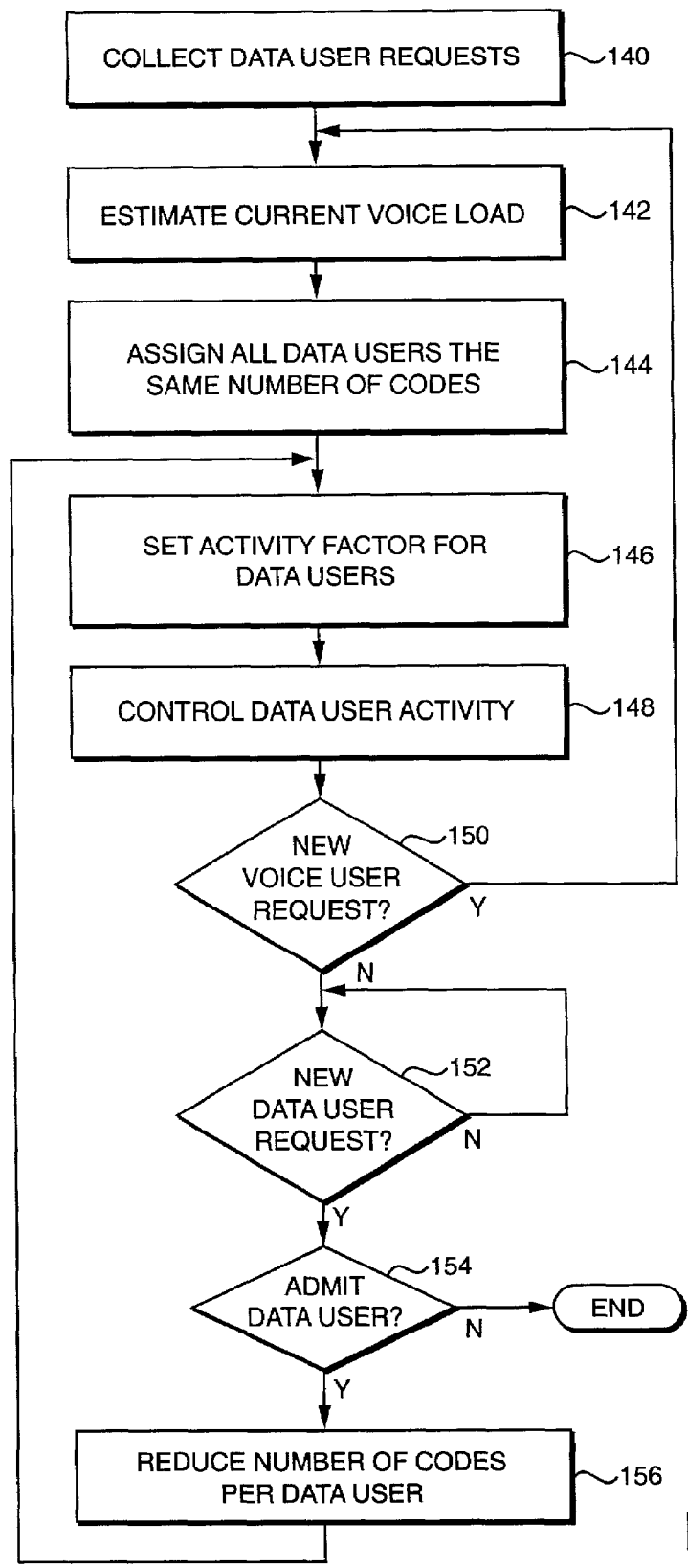

FIG. 8B illustrates a related method for enhancing CDMA cellular network capacity consistent with the present invention by controlling the activity level of data users. Steps 140–154 are identical to steps 120–134 in FIG. 8A. If the system decides to admit a new data user (step 154), the system may reduce the number of codes per data user (step 156), and processing returns to step 146. This provides an additional way to enhance free capacity for new users.

Power Control

In another method consistent with the present invention, power management is used to maintain QoS levels of existing users and maximize the free capacity available for new users. This results in admission control process that includes two main phases:

(1) The power of the active users is scaled appropriately to maximize the tolerance to additional interference. The tolerance margin for interference provides an estimate of the maximum data rate the network can support, given the current loading of the network. This data rate is also dependent on the QoS requirements of the links (frame error rate and outage probability). For example, users with lower FER and outage probability have a lower signal to interference ratio (SIR) requirement and contribute less interference to other active users. Therefore, the overall data rate that can be supported by the system at the lower QoS is higher, allowing more low rate users or increased data rate of a single user.

(2) The interference margin available from the scaling process is used to introduce new users into the system. The new users are selected from the pool of data users requesting service and allocated transmit power levels in a manner that optimizes some network wide measure, such as the overall throughput, the number of active users, the energy cost per bit, or an arbitrary revenue function.

A power allocation method consistent with the present invention allocates power to existing users in an optimal manner to maximize free capacity for additional users. In order to determine the optimal power allocation, a system with M active codes/channels is considered. A code/channel is active if it is currently being used by a user for transmission. Each active user may be holding one or more active codes. This represents a multi-code CDMA system where voice users and low rate data users use a single code transmitting a fixed fundamental speed, while high-speed data (HSD) users use a number of basic rate codes in parallel. Let $s=[s_1 s_2 \ldots s_M]$ be the vector of received powers from the M active codes. Let $s^{max}=[s_1^{max} s_2^{max} \ldots s_M^{max}]$ be the peak received power vector possible. $s_i^{max}$ is a function of the handset transmitter peak output power and the propagation gain from the user's current location. Note that $s_i^{max}$ can change with the location and velocity of the user, as the channel conditions between the user and the base station vary. All M codes are used to communicate with the same base station, i.e., there is a fixed base station assignment.

On the uplink of a CDMA system, the signals of interfering transmissions can be modeled as interfering noise signals. The SIR requirements of the code are denoted by $T_i$. For each of the M active codes, the SIR must remain above the $T_i$ level in order to ensure a certain frame error rate (FER). This requirement can be written as:

$$\frac{S_i}{\sum_{j \neq i} S_j + \eta + B} \geq T_i \forall\ i = 1, 2, \ldots, M \tag{41}$$

where $\eta$ is the other cell interference plus thermal noise. Note that there are M codes that are currently active. B is the interference that will be injected by the new codes to be activated. B is also referred to herein as the interference "slack" that the current loading of the system (M active codes) permits. Let $s^{min} = [s_1^{min} s_2^{min} \ldots s_M^{min}]$ denote the vector that satisfies the inequalities in equation (41) in equality with B=0, i.e., $$\frac{S_i^{min}}{\sum_{j \neq i} S_j^{min} + \eta} = T_i \forall\ i = 1, 2, \ldots, M \tag{42}$$

For a non-trivial solution s>0 of the inequalities in equation (42), it is straightforward to show that $0<T_i<1$. In a CDMA system, $T_i$ is the ratio of the required $E_b/N_0$ and the spreading gain.

The conditions for the existence of such a vector $s^{min}$ and its uniqueness have been described in several references, including G. J. Foschini and Z. Milanjic, "A simple distributed autonomous power control algorithm and its convergence," *IEEE Transactions on Vehicular Technology*, vol. 42, pp. 641–646, November, 1993, and R. D. Yates, "A framework for uplink power control in cellular radio systems," *IEEE Journal on Selected Areas in Communications*, vol. 13, pp. 1341–1346, September, 1995. The following analysis assumes that such a vector exists and is unique.

The relationship between any feasible vector s' and $s^{min}$ is given by:

$s' > s^{min}$ (elementwise)  Lemma (1)

By way of proof, Yates has demonstrated that starting with any feasible power vector s', a monotonically decreasing sequence of feasible power vectors can be constructed that converges to a unique fixed point as follows: Let s(0)=s'. Define the vector $I_i(s)=T_i(\Sigma_{j \neq i} s_j + \eta)$ Let s(n+1)=I(s(n)). Since the sequence is monotonically decreasing and the fixed point, $s^{min}$ is unique, $s(0) \geq s^{min} \Rightarrow s' \geq s^{min}$.

Therefore, s' can be represented as $s^1 = [\alpha_1 s_1^{min} \alpha_2 s_2^{min} \ldots \alpha_M s_M^{min}]$, where $\alpha_i$ is referred to as the "scaling" factor, and $\alpha_i \geq 1 \forall i = 1, 2, \ldots M$.

To ensure that the quality of active links is maintained while maximizing the interference "slack" B that can be used to admit new data users, a new power vector s* for the active users is determined that satisfies the inequalities in equation (41) for the largest possible value of B.

In order to formulate the problem, the following functions are defined:

$$g_i(s) := s_i - s_i^{max} \tag{43}$$

$$h_i(s) := -\left(\frac{s_i}{T_i} - \sum_{j \neq i} s_j - \eta\right)$$

$$f_i(s) := \frac{s_i}{T_i} - \sum_{j \neq i} s_j - \eta$$

the set $\Omega := \{s : s \geq 0,\ g_i(s) \leq 0\ \text{and}\ h_i(s) \geq \forall\ i = 1, 2, \ldots, M\}$ The set of feasible power vectors is determined by the maximum power limitations $g_i(s) \leq \forall i=1, 2 \ldots M$) and the active link quality constraints ($h_i(s) \leq 0 \forall i=1, 2 \ldots M$). Since the constraints are all linear functions of the power vector s, the feasible set is a bounded polyhedral cone. The optimal power vector s* that lies within the feasible set and results in the maximum value of B is also the power vector at which the function $\min_i f_i(s)$ has the maximum value, because any value of $B > \min_i f_i(s)$ will violate at least one of the M constraints in equation (41). Therefore, the problem may be stated as follows:

$P_0: \max_{s\ mini} f_i(s)$ subject to $g_i(s) \leq 0$ and $h_i(s) \leq 0 \forall i=1, 2 \ldots M$  (44)

This problem is a non-smooth optimization problem as the objective function $\min_i f_i(s)$ is not smooth. It is shown in R. Fletcher, *Practical Methods of Optimization*, p. 361, John Wiley & Sons, 1987, that problem $P_0$ has the following equivalent formulation:

$P_1: \max_{s,v} v$ subject to $v - f_i(s) \leq 0 \forall i=1, \ldots M$  (45)

This leads to the following theorem:

The two problems $P_0$ and $P_1$ are equivalent in the sense that if s* is a local solution of the problem $P_1$, s* also maximizes the objective function in problem $P_0$, $\min_i f_i(s)$.  Theorem (1)

By way of proof by contradiction, let s1 be the optimal solution for Problem $P_0$ and let f1 be the corresponding value of $\min_i f_i(s1)$. Suppose that (s1, $f1$) is not optimal for the equivalent formulation, problem $P_1$. Thus, there exists a vector s2 not equal to s1 and a corresponding optimal value v2, such that v2 is the maximum value satisfying $v2 < f_i(s2) \forall i$. By the definition of optimality for problem $P_1$, v2>v1 where v1 is the value of the objective function $\max_{s,v} v$ such that $v1 < f_i(s1) \forall i$. However, this contradicts the fact that s1 is an optimal value for the problem $P_0$ because the objective function in problem P0, $\min_i f_i(s)$, has a higher value at s2 than at s1. A similar argument can be made in the reverse direction. Since a local optimum in problem P1 is also a global optimum (convex objective function defined over a convex set), such a point is also the global optimal solution for problem $P_0$.

In order to determine the optimal power vector s*, consider how the objective function $\min_i f_i(s)$ varies over the set $\Omega$:

Given any point s1 in the strict interior of the bounded polyhedral cone $\Omega$, there exists at least one point s2 on the boundary of this set, where the objective function of problem $P_0$, $\min_i f_i(s)$, has a higher value than at s1, i.e., $\min_i f_i(s1) < \min_i f_i(s2)$.  Lemma (2)

By way of proof, since s1 is a feasible power vector, it may be represented as $s1 = [\alpha_{1,1} s_1^{min} \alpha_{1,2} s_2^{min} \ldots \alpha_{1,M} s_M^{min}]$.

$$\min_1 f_1(sI) = \min_1 \left( \frac{\alpha_{1,1} s_1^{\min}}{T_1} - \sum_{j \neq 1} \alpha_{1,j} s_j^{\min} - \eta \right) \quad (46)$$

$$= \min_1 \left( \sum_{j \neq 1} (\alpha_{1,1} - \alpha_{1,j}) s_j^{\min} + (\alpha_{1,1} - 1)\eta \right)$$

Let s2 be a new point constructed as follows: $s2 = [\alpha_{2,1} s_1^{\min}, \alpha_{2,2} s_2^{\min} \ldots \alpha_{2,M} s_M^{\min}]$. Let k denote the mobile which has the minimum value of the ratio of peak power to minimum required power i.e., $$\frac{s_k^{\max}}{s_k^{\min}} = \min_l \frac{s_l^{\max}}{s_l^{\min}}.$$

Define $$\Delta = \frac{s_k^{\max}}{s_l^{\min}} - \alpha_{1,k}$$

and let $\alpha_{2,i} = \alpha_{1,i} + \Delta$. Then s2 is a point on the boundary of the set $\Omega$. This is true because at s2, mobile k is transmitting at its peak power capability $s_k^{\max}$ while all other mobiles are at or below their peak transmit power thresholds, and the constraints $g(s) \leq 0$ and $h(s) \leq 0$ are satisfied.

$$\min_i f_i(s2) = \min_i \left( \sum_{j \neq 1} (\alpha_{2,i} - \alpha_{2,j}) s_j^{\min} + (\alpha_{2,i} - 1)\eta \right) \quad (47)$$

It is known that $\alpha_{2,i} - \alpha_{2,j} = (\alpha 1, i - \alpha 1, j)$ since the scaling factors $\alpha_1$ are adjusted by a constant factor $\Delta > 0$ for all mobiles. Since $\delta > 0$, $\alpha_{2,i} > \alpha_{1,i}$ and therefore $\min_i f_i(s2) > \min_i f_i(s1)$. This implies that the optimal power vector s* lies on the boundary of the set $\Omega$, where one or more of the constraints $h_i(s) < 0$ and $g_i(s) \leq 0$ are binding. The search for s* can be further focused by the following results.

If $g_i(s^{\min}) < 0 \forall i = 1, \ldots, M$, then at the optimal power vector s*, the constraints $h_i(s^*)$ are nonbinding, i.e., $$h_i(s^*) < 0. \quad \text{Lemma (3)}$$

By way of proof, let s* be the power vector that is optimum for problem $P_0$, such that at least one of the constraints $h_i(s^*)$, say $h_k(s^*)$, is binding, i.e., $h_k(s^*) = 0$. Then the optimal value of problem $P_0$ is 0, i.e., B=0, because $\min_i f_i(s^*) = f_k(s^*) = 0$. If $g_i(s^{\min}) < 0 \forall i = 1, \ldots, M$, then there exists a feasible point s1 which is obtained by simply scaling the power vector $s^{\min}$ by a suitable constant $\alpha > 1$ i.e., $s1 = \alpha s^{\min}$. Now, $f_i(s^{\min}) = 0 \forall i$. Also, $$f_i(s^{\min}) < \frac{1}{\alpha} f_i(\alpha s^{\min}) < f_i(s1)$$

since $\alpha > 1$. Therefore, $\min_i f_i(s1) > 0$ and hence, $\min_i f_i(s1) > \min_i f_i(s^*)$. This implies that s' cannot be the optimal power vector that solves problem $P_0$, thereby resulting in a contradiction.

This result implies that as long as none of the M codes are required to transmit at the peak power capability of the corresponding mobile in order to be active, i.e., $s_i^{\min} \neq s_i^{\max}$, the "slack" B that exists for admission of new users is non-zero.

At the optimal power vector s*, $f_i(s^*)$ is given by:

$$f_i(s^*) = f_j(s^*), \ i,j \in \{1,2,\ldots,M\}. \quad \text{Lemma (4)}$$

From Theorem (1), it is known that the power vector s that solves problem $P_1$ also solves problem $P_0$. The problem $P_1$ is a smooth optimization problem, and since the feasible set $\Omega$ is bounded and convex, and the objective function is concave, the Kuhn-Tucker conditions for the global optimal solution s* can be written. The K-T conditions are both necessary and sufficient conditions for an optimal solution s* to problems $P_0$ and $P_1$.

The appropriate Lagrangian function for the problem $P_1$ would be:

$$L(s, v, a, b, c) = v - \sum_i^M a_i g_i(s) - \sum_i^M b_i h_i(s) - \sum_i^M c_i(v - f_i(s)) \quad (48)$$

where the vectors a, b, and c are the Lagrange multipliers. The K-T conditions yield:

$$\frac{\delta}{\delta v} L(s^*, v^*, a, b, c) = 0 \Rightarrow \sum_i^M c_i = 1 \quad (49)$$

$$\nabla_s L(s^*, v^*, a, b, c) = 0 \Rightarrow a_i + \sum_{j \neq i} b_j - \frac{b_i}{T_i} + \sum_{j \neq i} c_j - \frac{c_i}{T_i} = 0 \quad (50)$$

$$a_i, b_i, c_i \geq 0; \ \forall i = 1, \ldots, M \quad (51)$$

$$a_i g_i(s^*) = 0; \ \forall i = 1, \ldots, M \quad (52)$$

$$b_i h_i(s^*) = 0; \ \forall i = 1, \ldots, M \quad (53)$$

$$c_i(v^* - f_i(s^*)) = 0; \ \forall i = 1, \ldots, M \quad (54)$$

Equations (52–54) are the complementary slackness conditions. From Lemma (3), it is known that $h_i(s^*) \neq 0$, and therefore, from equation (53), $b_i = 0$. Substituting for $b_i$ in equation (50), $$a_l + \sum_{j \neq l} c_j = \frac{c_l}{T_l} \quad (55)$$

If for any k, $c_k$ is 0, then from equations (51) and (55), it is seen that for all i, $c_i = 0$, and hence $$\sum_i^M c_i = 0.$$

This is a contradiction of the condition in equation (49). Hence, $c_i>0$ for all i. Then, equation (54) implies that $f_i(s^*)=v$ for all i or $f_i(s^*)=f_j(s^*)$ for any i and j.

This result implies that at the optimal received power vector s*, all mobiles have the same "slack" B or tolerance margin for interference to be introduced by new users. In order to determine s*, the appropriate scaling vector $\alpha^*$ must be determined. The following result translates the equal slack requirement in Lemma (4) to the corresponding condition on the optimal scaling vector $\alpha$.

Let s be any feasible vector, represented by $s=[\alpha_1 s_1^{min} \ldots \alpha_M^{min}]$. If $f_k(s)=f_i(s)$, then $$\alpha_k=\alpha_i \qquad \text{Lemma (5)}$$

By way of proof, equations (42) and (43) yield:

$$f_l(s) = \sum_{j \neq l}(\alpha_l - \alpha_j)s_j + (\alpha_l - 1)\eta \qquad (56)$$

$$f_k(s) = \sum_{j \neq j}(\alpha_k - \alpha_j)s_j + (\alpha_k - 1)\eta$$

Since $f_l(s)=f_k(s)$, the following is true:

$$\alpha_l\left[\sum_{j \neq l,k} s_j + s_k\right] - \left[\sum_{j \neq k,l}\alpha_j s_j + \alpha_k s_k\right] + (\alpha_l - 1)\eta = \qquad (57)$$

$$\alpha_k\left[\sum_{j \neq l,k} s_j + s_l\right] - \left[\sum_{j \neq k,l}\alpha_j s_j + \alpha_l s_l\right] + (\alpha_k - 1)\eta$$

From equation (57), it follows that $\alpha_l=\alpha_k$.

This result allows us to determine the optimal solution s* of the original problem $P_0$. The result in Lemma (5) indicates that "uniform" scaling (same scaling factor, $\alpha_i=\alpha_j \forall i,j$) of the minimum power vector $s^{min}$ yields s*. The constant scaling factor $\alpha^*$ is limited by the peak transmit powers of the mobiles at the current instant.

The optimal power vector is given by the following theorem:

The optimal solution of Problem $P_0$ is the power vector s* given by $s^*=\alpha^* s^{min}$, where $$\alpha^* = \min_l\left(\frac{s_l^{max}}{s_l^{min}}\right).$$

Further, the value of the optimal solution (the maximum "slack" B) is $$(\alpha^*-1)\eta \qquad \text{Theorem (2)}$$

Since the M codes are active, there exists at least one feasible power vector and therefore there exists a unique minimum power vector $s^{min}$. The maximum received power vector $s^{max}$ is assumed to be known and fixed at the admission epoch. From Lemma (5), a necessary and sufficient condition for the optimal solution to problem $P_0$ is that $s^*=\alpha s^{min}$, where $\alpha$ is a constant. As this constant scaling factor increases, the value of the slack B also increases, i.e., if $\alpha 1>\alpha 2$ then $\min_i f_i(\alpha 1 s^{min})>\min_i f_i(\alpha 2 s^{min})$. Therefore, the optimal vector s* is obtained by scaling $s^{min}$ by the largest constant. Since s* is also a feasible power vector, the largest such value is $$\alpha^* = \min_l\left(\frac{s_l^{max}}{s_l^{min}}\right).$$

If the scaling factor is greater than $\alpha^*$, at least one of the M codes will be peak power limited and unable to attain its QoS.

The solution of problem $P_0$ provides the maximum slack B that the system can tolerate with M active codes. Based on the above solution s* and using equation (42) and Lemma (4), $$B = s_l^* - \sum_{j \neq l} s_j^* - \eta \qquad (58)$$

$$= \alpha^*\left[\sum_{j \neq l} s_j^{min} + \eta\right] - \sum_{j \neq l} s_j^* + \eta$$

$$= (\alpha^* - 1)\eta.$$

Figure 9A:
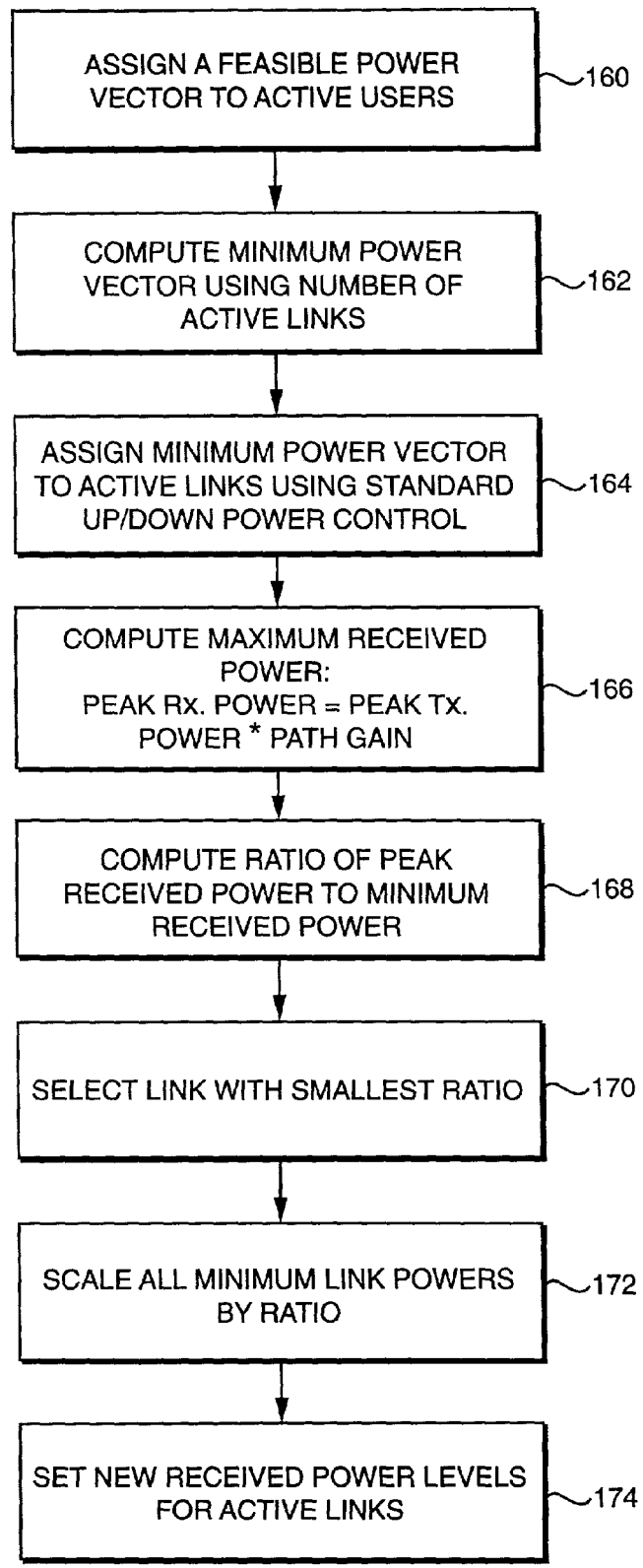
FIGS. 9A–9B are flowcharts illustrating the steps of a third method for enhancing cellular network capacity consistent with the present invention.

The optimal power allocation given by Theorem (2) is used in a method consistent with the present invention to enhance CDMA cellular network capacity by controlling power levels. FIG. 9A illustrates a method consistent with the present invention for power control. The method implements the optimal solution given by Theorem (2). Initially, a feasible power vector is assigned to the active users (step 160). The initial power vector may be determined analytically or through the standard process through which users ramp-up their power. Next, the minimum power vector is computed using the active links (step 162). The power levels of this minimum power vector are then assigned to the active users using standard up/down power control commands from the base station (step 164). Next, the maximum received handset power is determined as the product of the peak handset transmission power, which is known, and the path gains, which is measured using standard power control procedures (step 166). Then the ratio of peak received power to the minimum received power computed in step 162 is determined (step 168). The link with the smallest such ratio is determined (step 170), and all active link powers (i.e., the minimum powers previously assigned) are scaled by the ratio to determine new received power levels, as shown in Theorem (2) (step 172). Finally, the new received power levels are set on the active links using standard up/down control commands (step 174).

Figure 9B:
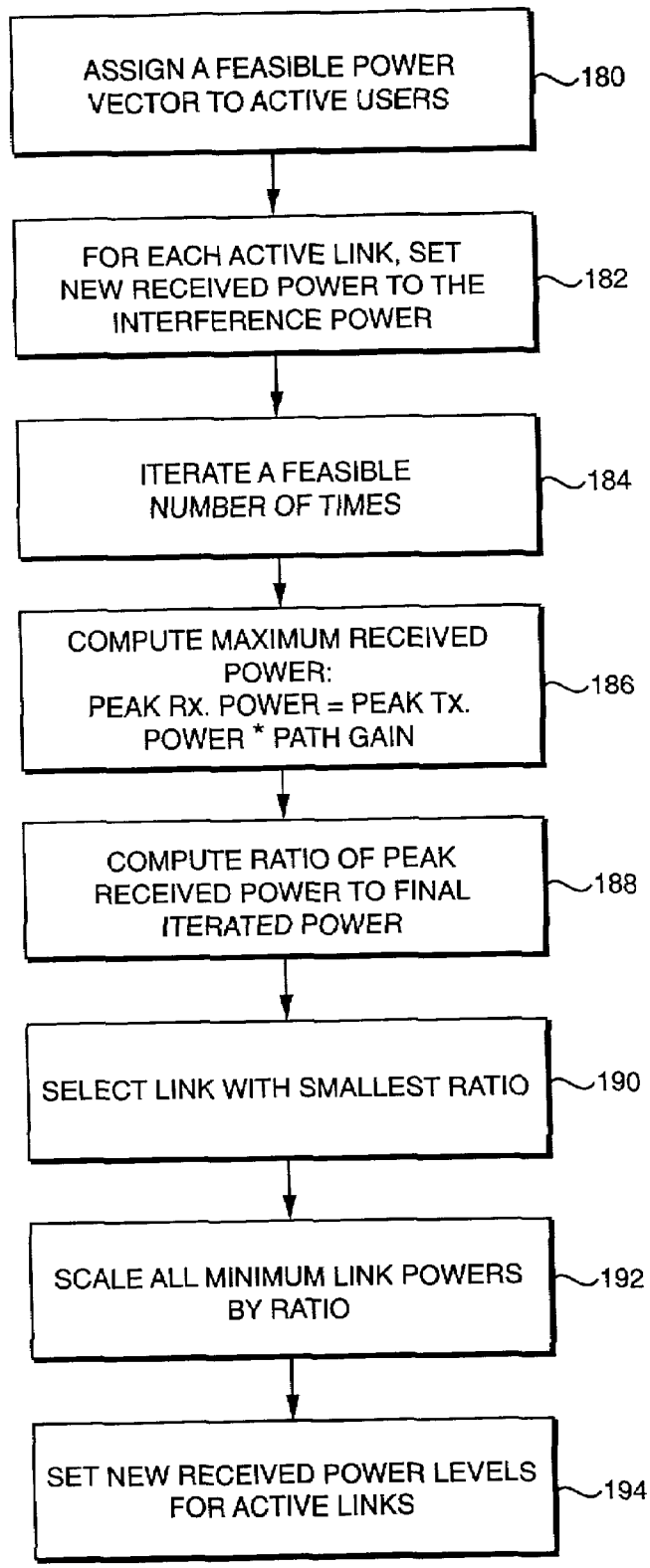

FIG. 9B illustrates another power control method consistent with the present invention. The method is similar to that in FIG. 9A, except that the minimum power vector is obtained in a different manner (steps 182–184). In step 182, the received power of each user is set to the interference power. If this is repeated an infinite number of times, it has been shown that the achieved power vector is the same as the minimum power vector determined in step 162 in FIG. 9A. Since it is physically impossible to repeat step 182 an infinite number of times, a vector close to the minimum power vector may be achieved by iterating a large enough number of times (step 184). Once an approximation of the minimum power vector is achieved, the remaining steps (steps 186–194) are identical to steps 166–174 in FIG. 9A.

It will be apparent to those skilled in this art that various modifications and variations can be made to the capacity enhancement schemes of the present invention without departing from the spirit and scope of the invention. Other embodiments of the invention will be apparent to those skilled in this art from consideration of the specification and practice of the invention disclosed herein. For example, a power allocation method consistent with the present invention may be implemented anywhere in the cellular network where power control processing occurs. Similarly, a QoS control method consistent with the present invention may be implemented anywhere in the network where QoS parameters are controlled. It is intended that the specification and examples be considered exemplary only, with the true scope and spirit of the invention being indicated by the following claims.

What is claimed is:

1. A method for enhancing the capacity of a CDMA cellular carrier supporting traffic from a plurality of users, including a plurality of voice users and a plurality of multi-code data users, each user having an adjustable received power level, and the plurality of voice users having a fixed quality of service requirement, the method comprising the steps of:

setting a quality of service requirement for the plurality of data users based on the traffic from the plurality of users and the voice user quality of service requirement;

adjusting the received power level of each of the plurality of voice users so that their received power levels are identical;

adjusting the received power level of each of the plurality of data users so that their received power levels are identical to the received power levels of the plurality of voice users;

decreasing the received power level of each of the plurality of data users until their quality of service requirement is satisfied; and adjusting the quality of service requirement for the plurality of data users in response to a request from a new user to access the cellular carrier.

2. A computer-readable medium containing instructions for enhancing the capacity of a CDMA cellular carrier supporting traffic from a plurality of users, including a plurality of voice users and a plurality of multi-code data users, each user having an adjustable received power level, and the plurality of voice users having a fixed quality of service requirement by:

setting a quality of service requirement for the plurality of data users based on the traffic from the plurality of users and the voice user quality of service requirement;

adjusting the received power level of each of the plurality of voice users so that their received power levels are identical;

adjusting the received power level of each of the plurality of data users so that their received power levels are identical to the received power levels of the plurality of voice users;

decreasing the received power level of each of the plurality of data users until their quality of service requirement is satisfied; and adjusting the quality of service requirement for the plurality of data users in response to a request from a new user to access the cellular carrier.

* * * * *